United States Patent
Ogura

(10) Patent No.: US 6,480,057 B2
(45) Date of Patent: *Nov. 12, 2002

(54) CHARGE PUMP CIRCUIT ALLOWING EFFICIENT ELECTRIC CHARGE TRANSFER

(75) Inventor: Taku Ogura, Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/461,004

(22) Filed: Dec. 15, 1999

(65) Prior Publication Data

US 2002/0024377 A1 Feb. 28, 2002

(30) Foreign Application Priority Data

Jun. 23, 1999 (JP) ............................................. 11-176610

(51) Int. Cl.[7] ................................ G05F 1/10; G05F 3/02
(52) U.S. Cl. ..................................... 327/536; 365/189.23
(58) Field of Search ................................. 327/534, 535, 327/536, 537; 326/67, 68, 81, 83; 365/189.09, 189.11, 185.23

(56) References Cited

U.S. PATENT DOCUMENTS

| | | | | |
|---|---|---|---|---|
| 5,831,470 A | * | 11/1998 | Park et al. | 327/536 |
| 5,841,725 A | * | 11/1998 | Kang et al. | 365/226 |
| 5,886,566 A | * | 3/1999 | Park et al. | 327/536 |
| 5,909,141 A | * | 6/1999 | Tomishima | 327/536 |
| 6,078,212 A | * | 6/2000 | Lekhani | 327/536 |

* cited by examiner

Primary Examiner—Terry D. Cunningham
Assistant Examiner—Quan Tra
(74) Attorney, Agent, or Firm—McDermott, Will & Emery

(57) ABSTRACT

In a charge pump unit circuit, a P channel MOS transistor is connected between a gate and a drain of switching N channel MOS transistor. The P channel MOS transistor is controlled to be on/off by a switching circuit. A voltage doubling circuit generates a clock signal having amplitude twice that of power supply voltage. The clock signal is applied to a capacitor to increase the potential of the gate of the N channel MOS transistor. Thus, resistance of the N channel MOS transistor sufficiently is reduced and transfer efficiency of positive charge is enhanced.

9 Claims, 18 Drawing Sheets

WRITING

ERASING

FIG. 5
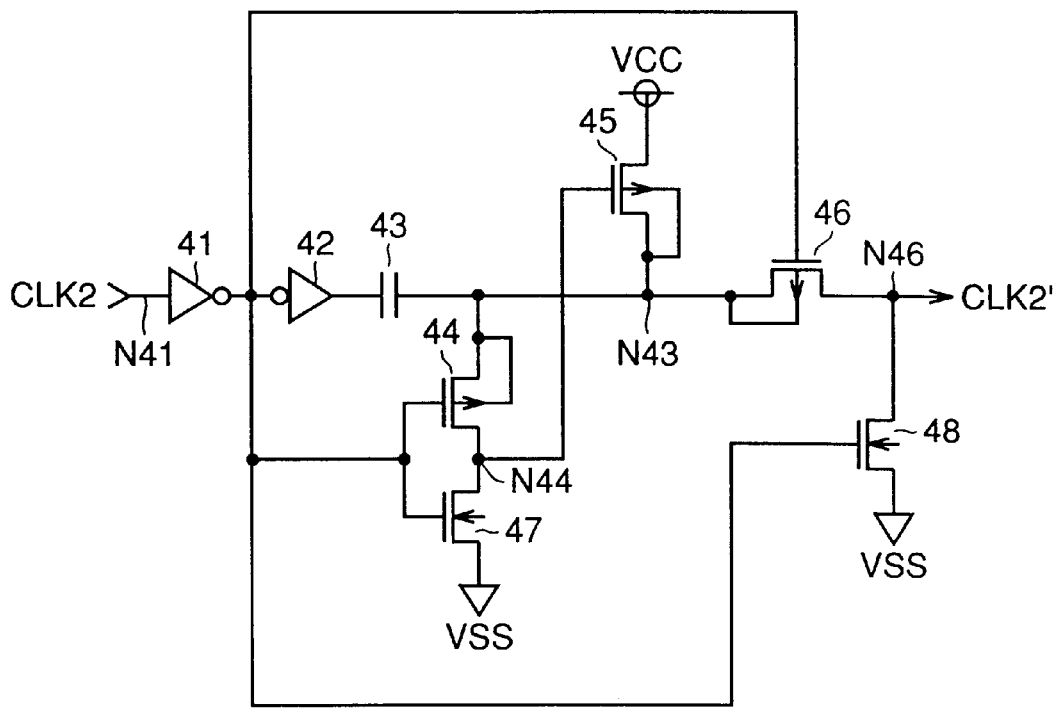
FIG. 6A  CLK2  VCC
FIG. 6B  CLK2'  2VCC
TIME t →

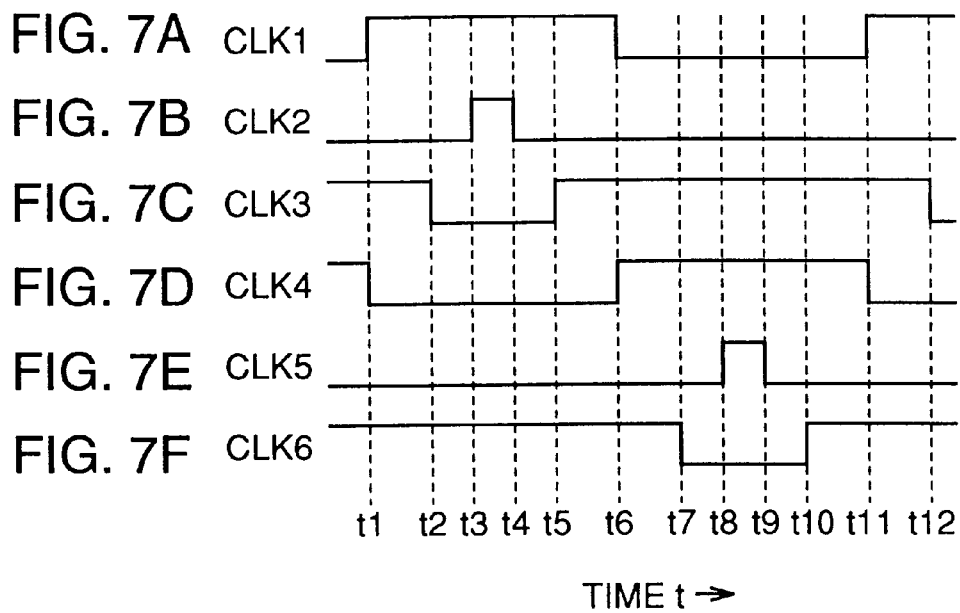
FIG. 7A CLK1
FIG. 7B CLK2
FIG. 7C CLK3
FIG. 7D CLK4
FIG. 7E CLK5
FIG. 7F CLK6
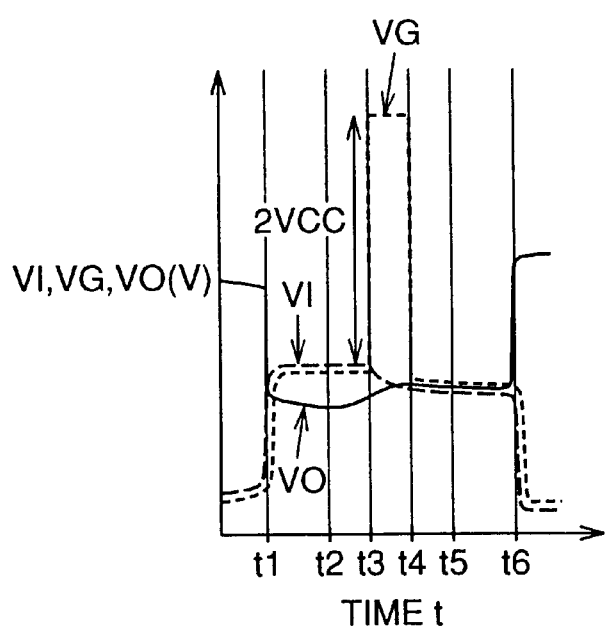
FIG. 8

FIG.10A CLK2 — VCC
FIG.10B CLK2' — VCP

TIME t →

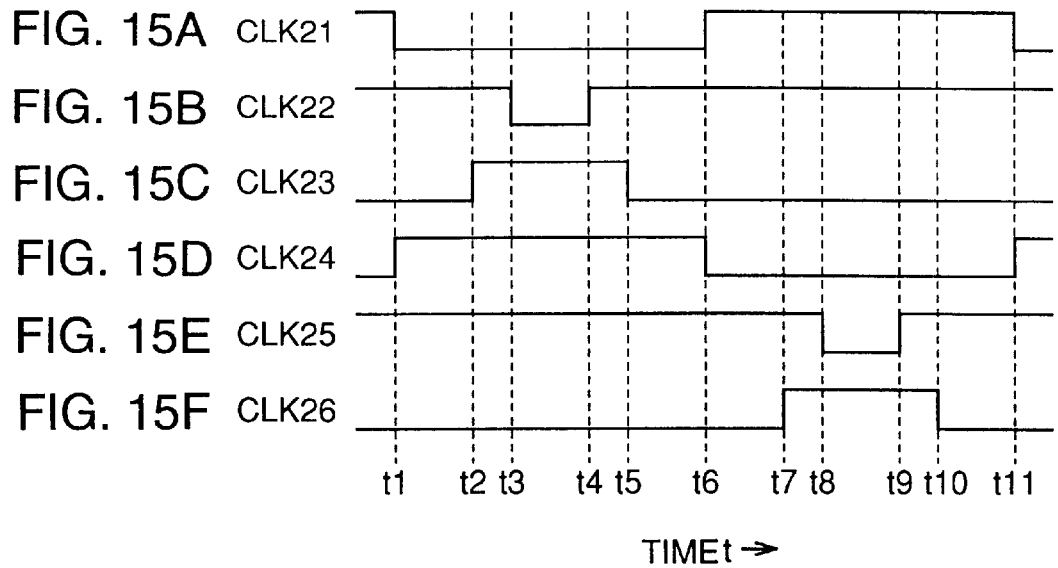
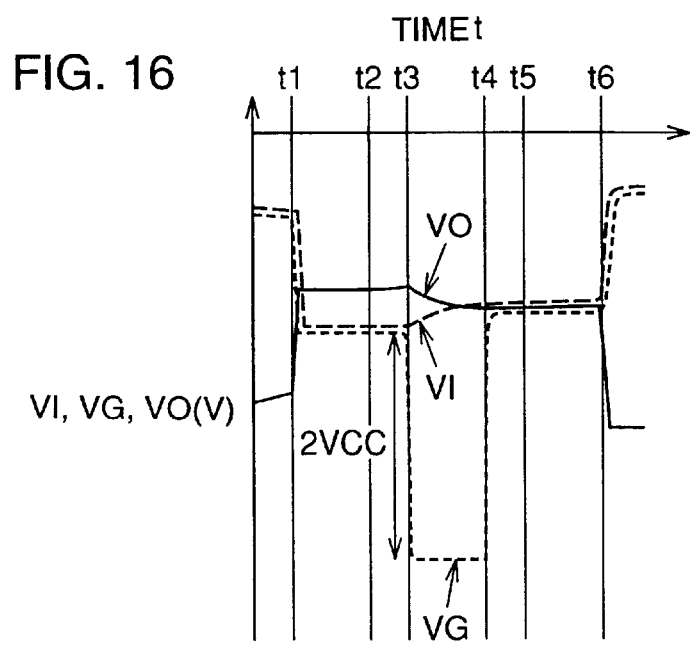

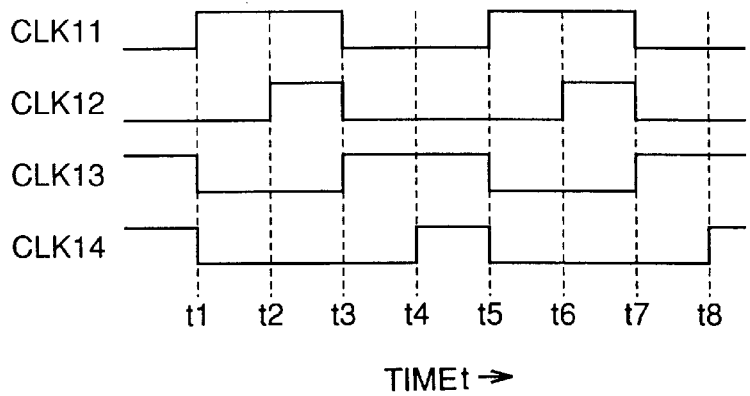
FIG. 20A PRIOR ART CLK11
FIG. 20B PRIOR ART CLK12
FIG. 20C PRIOR ART CLK13
FIG. 20D PRIOR ART CLK14
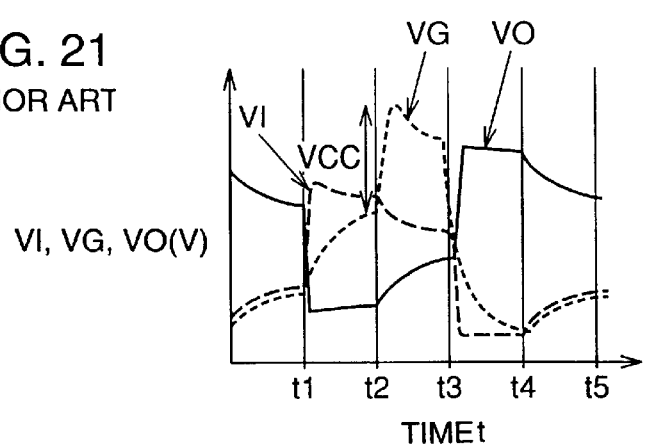
FIG. 21 PRIOR ART

FIG. 23A PRIOR ART CLK31

FIG. 23B PRIOR ART CLK32

FIG. 23C PRIOR ART CLK33

FIG. 23D PRIOR ART CLK34

TIME t →

CHARGE PUMP CIRCUIT ALLOWING EFFICIENT ELECTRIC CHARGE TRANSFER

BACKGROUND OF THE INVENTION

1. Field of the Invention

The present invention relates to a charge pump circuit, and more particularly to a charge pump circuit transferring positive electric charge or negative electric charge of an input node to an output node in synchronization with a clock signal.

2. Description of the Background Art

Conventionally, a flash memory includes a positive charge pump circuit and a negative charge pump circuit to generate a high voltage for data writing and data erasing (see FIG. 1).

FIGS. 19A to 19C are circuit block diagrams showing a structure of a conventional positive charge pump circuit.

In FIG. 19A, the positive charge pump circuit includes an N channel MOS transistor 101 and N (where N is an even number) stage charge pump unit circuits 102.1–102.N connected in series. N channel MOS transistor 101 is diode connected between a line of power supply potential VCC and an input node of charge pump unit circuit 102.1 of the first stage.

Charge pump unit circuits 102.1, 102.3, . . . , 102.N−1 located at odd-numbered stages supply positive charge to charge pump unit circuits 102.2, 102.4, . . . , 102.N located next to them, respectively, in synchronization with clock signals CLK11 and CLK12. Charge pump unit circuits 102.2, 102.4, . . . , 102.N located at even-numbered stages supply positive charge to charge pump unit circuits 102.3, 102.5, . . . , 102.N−1 located next to them and to an output node, respectively, in synchronization with clock signals CLK13 and CLK14. An output potential of charge pump unit circuit 102.N of the last stage is an output potential VO of the positive charge pump circuit.

Charge pump unit circuit 102.1 includes an N channel MOS transistor 103, a resistance element 104, and capacitors 105 and 106 as shown in FIG. 19B. N channel MOS transistor 103 is connected between an input node N102 and an output node N103 of charge pump unit circuit 102.1. Resistance element 104 is connected between a gate of N channel MOS transistor 103 and an input node N102. Capacitor 105 has one electrode receiving clock signal CLK11 and another electrode connected to input node N102. Capacitor 106 has one electrode receiving clock signal CLK12 and another electrode connected to the gate of N channel MOS transistor 103.

Charge pump unit circuits 102.3, 102.5, . . . , 102.N−1 of odd-numbered stages are each of the same structure with charge pump unit circuit 102.1. Charge pump unit circuit 102.2, 102.4, . . . , 102.N of even-numbered stages are each same with charge pump unit circuit 102.1 except that clock signals CLK13 and CLK14 are employed instead of clock signals CLK11 and CLK12 as shown in FIG. 19C.

FIGS. 20A–20D are waveform diagrams of clock signals CLK11–CLK14. FIG. 21 is a schematic waveform diagram of a potential VI of input node N102, a gate potential VG of N channel MOS transistor 103, and potential VO of output node N103 in each of charge pump unit circuits 102.1, 102.3, . . . , 102.N−1 of odd-numbered stages. Next, an operation of the positive charge pump circuit will be described with reference to FIGS. 20A–20D and FIG. 21.

First, with reference to FIGS. 20A–20D, clock signal CLK11 has a predetermined period and its duty factor is 50%. In FIGS. 20A–20D, clock signal CLK11 attains an "H" level (a logical high level) from t1 to t3 and from t5 to t7, whereas attains an "L" level (a logical low level) from t3 to t5. Each of clock signals CLK12 to CLK14 has the same period as clock signal CLK11. Clock signal CLK12 attains an "H" level in the latter half (that is, t2–t3 and t6–t7) of a time period during which clock signal CLK11 is atan "H" level and attains an "L" level in other time period. Clock signals CLK13 and CLK14 are a half period delayed from clock signals CLK11 and CLK12, respectively.

Before t1, clock signals CLK11 and CLK12 are both at an "L" level. Therefore, VI and VG are both atan "H" level and capacitors 105 and 106 are charged with power supply voltage VCC.

At t1, clock signal CLK11 is turned from an "L" level to an "H" level. Then the potential on input node N102 is boosted by an amount of power supply voltage VCC via capacitor 105 and the boosted potential VI on input node N102 is transferred to a gate of N channel MOS transistor 103 via resistance element 104. Gate potential VG rises according to a curve determined by a time constant of the circuit.

At t2, clock signal CLK12 is turned from an "L" level to an "H" level. Then gate potential VG is boosted by an amount of power supply voltage VCC via capacitor 106. As a resistance of N channel MOS transistor 103 decreases, positive charge is transferred from input node N102 to output node N103, whereby input potential VI falls and output potential VO rises.

At t3, clock signals CLK11 and CLK12 are turned from an "H" level to an "L" level. Thus the states of the signals return to the states before t1.

During the time period from t3 to t5, clock signals CLK11 and CLK12 are held atan "L" level and charge pump unit circuits 102.1, 102.3, . . . , 102.N−1 of odd-numbered stages do not operate. During the time period from t3 to t5, charge pump unit circuits 102.2, 102.4, . . . , 102.N of even-numbered stages operate in the same manner as charge pump unit circuits 102.1, 102.3, . . . , 102.N−1 of odd-numbered stages from t1 to t3.

Thus in the positive charge pump circuit, charge pump unit circuits 102.1, 102.3, . . . , 102.N−1 of odd-numbered stages and charge pump unit circuits 102.2, 102.4, . . . , 102.N of even-numbered stages alternately operate in synchronization with clock signals CLK11 to CLK14. Positive charge is supplied from each charge pump unit circuit to a charge pump unit circuit of the next stage. Positive charge is boosted in each charge pump unit circuit and charge pump unit circuit 102.N of the final stage outputs a positive potential VO of a high level.

FIGS. 22A–22C are circuit block diagrams showing a structure of a conventional negative charge pump circuit.

In FIG. 22A, the negative charge pump circuit includes a P channel MOS transistor 111 and N stages of charge pump unit circuits 112.1 to 112.N connected in series. P channel MOS transistor 111 is diode connected between an input node of charge pump unit circuit 112.1 of the first stage and a line of a ground potential VSS.

Charge pump unit circuits 112.1, 112.3, . . . , 112.N−1 of odd-numbered stages supply negative charge to charge pump unit circuits 112.2, 112.4, . . . , 112.N located next to them, respectively, in synchronization with clock signals CLK31 and CLK32. Charge pump unit circuits 112.2, 112.4, 112.N−2 of even-numbered stages supply negative charge to charge pump unit circuits 112.3, 112.5, . . . , 112.N−1 located next to them and to an output node, respectively, in synchronization with clock signals CLK33 and CLK34. An output potential of charge pump unit circuit 112.N of the last stage is an output potential VO of the negative charge pump circuit.

Charge pump unit circuit 112.1 includes a P channel MOS transistor 113, a resistance element 114, and capacitors 115 and 116 as shown in FIG. 22B. P channel MOS transistor 113 is connected between an input node N112 and an output node N113 of charge pump unit circuit 112.1. Resistance element 114 is connected between a gate of P channel MOS transistor 113 and input node N112. Capacitor 115 has one electrode receiving clock signal CLK31 and another electrode connected to input node N112. Capacitor 116 has one electrode receiving clock signal CLK32 and another electrode connected to the gate of N channel MOS transistor 113.

Other charge pump unit circuits 112.3, 112.5, ..., 112.N−1 of odd-numbered stages are each of the same structure with charge pump unit circuit 112.1. Charge pump unit circuits 112.2, 112.4, ..., 112.N of even-numbered stages are each same with charge pump unit circuit 112.1 except that clock signals CLK33 and CLK34 are employed instead of clock signals CLK31 and CLK32 as shown in FIG. 22C.

FIGS. 23A to 23D are waveform diagrams of clock signals CLK31 to CLK34. FIG. 24 is a schematic waveform diagram of a potential VI of input node N112, a gate potential VG of P channel MOS transistor 113, and a potential VO of output node N113 in each of charge pump unit circuits 112.1, 112.3, ..., 112.N−1 of odd-numbered stages. Next, an operation of the negative charge pump circuit will be described with reference to FIGS. 23A to 23D and FIG. 24.

First, with reference to FIGS. 23A to 23D, clock signal CLK31 has a predetermined period and the duty factor is 50%. In FIGS. 23A to 23D, clock signal CLK31 attains an "L" level from t1 to t3 and attains an "H" level from t3 to t5. Each of other clock signals CLK32 to CLK34 has the same period as clock signal CLK31. Clock signal CLK32 attains an "L" level at the latter half (t2–t3) of a time period during which clock signal CLK31 is at an "L" level, and is at an "H" level in other time period. Clock signals CLK33 and CLK34 are half period delayed from clock signals CLK31 and CLK32, respectively.

Before t1, clock signals CLK31 and CLK32 are both at an "H" level. Therefore, VI and VG are both at an "L" level and capacitors 115 and 116 are charged with a power supply voltage −VCC.

At t1, clock signal CLK31 is turned from an "H" level to an "L" level. Then the potential of input node N112 is lowered by an amount of power supply voltage VCC via capacitor 115 and the lowered potential VI on input node N112 is transferred to the gate of N channel MOS transistor 113 via resistance element 114. Gate potential VG falls according to a curve determined by a time constant of the circuit.

At t2, clock signal CLK32 is turned from an "H" level to an "L" level. Then gate potential VG is lowered by an amount of power supply voltage VCC via capacitor 116. As a resistance of P channel MOS transistor 113 decreases, negative charge is transferred from input node N112 to output node N113, whereby input potential VI rises and output potential VO falls.

At t3, clock signals CLK31 and CLK32 are turned from an "L" level to an "H" level. Thus the states of the signals return to the states before t1.

During the time period from t3 to t5, clock signals CLK31 and CLK32 are held at an "H" level and charge pump unit circuits 112.1, 112.3, ..., 112.N−1 of odd-numbered stages do not operate. During the time period from t3 to t5, charge pump unit circuits 112.2, 112.4, ..., 112.N of even-numbered stages operate in the same manner as charge pump unit circuits 112.1, 112.3, ..., 112.N−1 of odd-numbered stages from t1 to t3.

Thus in the negative charge pump circuit, charge pump unit circuits 112.1, 112.3, ..., 112.N−1 of odd-numbered stages and charge pump unit circuits 112.2, 112.4, ..., 112.N of even-numbered stages alternately operate in synchronization with clock signals CLK31 to CLK34. Negative charge is supplied from each charge pump unit circuit to a charge pump unit circuit of the next stage. Negative charge is decreased in each charge pump unit circuit and charge pump unit circuit 112.N of the final stage outputs a negative potential VO of a high level.

With the introduction of a low power supply voltage in semiconductor devices, flash memories are also required to operate at a low power supply voltage. Flash memories include charge pump circuits for generating a high voltage as described above. When power supply voltage is lowered (especially when it becomes lower than 2V), however, the generation of high voltage becomes difficult in the conventional charge pump circuit.

In the positive charge pump circuit shown in FIGS. 19A to 19C, the condition VG−VO>Vthn (where Vthn is the threshold voltage of N channel MOS transistor 103) must be satisfied in order to render N channel MOS transistor 103 conductive. As Vthn increases towards the final stage because of a so-called substrate effect, the conduction of N channel MOS transistor 103 becomes hard to establish. Thus the positive charge cannot efficiently be transferred to the next stage.

Similarly, in the negative charge pump circuit shown in FIGS. 22A to 22C, the condition VG−VO<Vthp (where Vthp is the threshold voltage of P channel MOS transistor 113) must be satisfied in order to render P channel MOS transistor 113 conductive. As Vthp increases towards the final stage because of a so-called substrate effect, the conduction of P channel MOS transistor 113 becomes hard to establish. Thus the negative charge cannot efficiently be transferred to the next stage.

SUMMARY OF THE INVENTION

Therefore, a main object of the present invention is to provide a charge pump circuit allowing an efficient transfer of electric charge.

According to one aspect of the present invention, the charge pump circuit transferring positive charge or negative charge of an input node to an output node in synchronization with a clock signal, includes a first transistor of a first conductivity type connected between the input node and the output node; a second transistor of a second conductivity type connected between the input node and an input electrode of the first transistor; a first driving circuit pulling down or pulling up a potential of the input node by an amount of a first voltage during a first time period of each period of the clock signal; a first switching circuit turning the second transistor non conductive by connecting an input electrode of the second transistor and the input electrode of the first transistor during a second time period in the first time period and turning the second transistor conductive by supplying an activation potential to the input electrode of the second transistor during a time period other than the second time period; and a second driving circuit turning the first transistor conductive by pulling up or pulling down a potential of the input electrode of the first transistor by an amount of a second voltage during a third time period in the second time period. Therefore, dissimilar to the conventional device where a resistance element is connected between the input node and the input electrode of the first transistor, positive or negative charge of the input electrode of the first transistor does not flow back to the input node at the rise and the fall of a potential of the input electrode of the first transistor. Thus, the resistance of the first transistor can be reduced and the efficient charge transfer is allowed.

Preferably, the first voltage is a power supply voltage; the second voltage is higher than the power supply voltage; and the second driving circuit includes an amplitude converting circuit receiving a reference clock signal being at a first potential during the third time period and at a second potential during a time period other than said third time period, and having an amplitude equal to the power supply voltage, and converting the amplitude of the reference clock signal to the second voltage and supplying the result as an output, and a first capacitor having one electrode receiving an output clock signal of the amplitude converting circuit and another electrode connected to the input electrode of the first transistor. In this case, the resistance of the first transistor can be further reduced and the even more efficient charge transfer is allowed.

Still more preferably, the second voltage is twice as high as the power supply voltage, and the amplitude converting circuit includes, a second capacitor, a charge circuit charging the second capacitor to the level of power supply voltage by supplying power supply potential to one electrode of the second capacitor and supplying a ground potential to another electrode of the second capacitor during a time period in which the reference clock signal is at the second or first potential, and a second switching circuit supplying the power supply potential to another electrode of the second capacitor charged by the charge circuit and connecting one electrode of the second capacitor to one electrode of the first capacitor in a time period in which the reference clock signal is at the first or second potential, and supplying the ground potential to one electrode of the first capacitor during a time period in which the reference clock signal is at the second or first potential. In this case, the potential of the input electrode of the first transistor can be increased or decreased by an amount corresponding to twice the power supply voltage. Hence the resistance of the first transistor can sufficiently be lowered.

Still more preferably, the amplitude converting circuit includes, an internal charge pump circuit supplying positive charge to an internal power supply node, a control circuit controlling the internal charge pump circuit so as to turn a potential of the internal power supply node to a predetermined reference potential, and a second switching circuit connecting one electrode of the first capacitor to the internal power supply node during a time period in which the reference clock signal is at the first or second potential and supplying the ground potential to one electrode of the first capacitor during a time period in which the reference clock signal is at the second or first potential. In this case, the potential of the input electrode of the first transistor can be increased or decreased by a desired amount by setting the reference potential at a desired level. Hence, the resistance of the first transistor can sufficiently be lowered.

According to another aspect of the present invention, the charge pump circuit transferring positive charge or negative charge of an input node to an output node in synchronization with a clock signal, includes: a transistor connected between the input node and the output node; a resistance element connected between the input node and an input electrode of the transistor; a first driving circuit pulling down or pulling up a potential of the input node by an amount of a power supply voltage during a first time period of each period of the clock signal; and a second driving circuit turning the transistor conductive by pulling up or pulling down a potential of the input electrode of the transistor by an amount of a predetermined voltage higher than the power supply voltage during a second time period in the first time period. The second driving circuit includes an amplitude converting circuit receiving a reference clock signal being at a first potential during the second time period and at a second potential during a time period other than said second time period and having an amplitude equal to the power supply voltage, and, converting the amplitude of the reference clock signal to the predetermined voltage and supplying the result as an output, and a first capacitor having one electrode receiving an output clock signal of the amplitude converting circuit and another electrode connected to the input electrode of the transistor. Therefore, the resistance of the transistor can be reduced compared with the conventional device where the potential of the input electrode of the transistor is increased or decreased solely by the power supply voltage and electric charge can efficiently be transferred.

According to still another aspect of the present invention, the charge pump circuit transferring positive charge or negative charge of an input node to an output node in synchronization with a clock signal, includes: a transistor connected between the input node and the output node; a diode element connected between the input node and an input electrode of the transistor; a first driving circuit pulling down or pulling up a potential of the input node by an amount of power supply voltage during a first time period of each period of the clock signal; and a second driving circuit turning the transistor conductive by pulling up or pulling down a potential of the input electrode of the transistor by an amount of a predetermined voltage higher than the power supply voltage during a second time period in the first time period. The second driving circuit includes an amplitude converting circuit receiving a reference clock signal having the same period with the clock signal, being at a first potential during the second time period of each period and at a second potential during a time period other than said second time period and having an amplitude equal to the power supply voltage, and, converting the amplitude of the reference clock signal to the predetermined voltage and supplying the result as an output, and a first capacitor having one electrode receiving an output clock signal of the amplitude converting circuit and another electrode connected to the input electrode of the transistor. Therefore, the resistance of the transistor can be reduced compared with the conventional device where the potential of the input electrode of the transistor is increased or decreased solely by the power supply voltage and electric charge can efficiently be transferred. In addition, positive or negative charge of the input electrode of the transistor do not flow back to the input node when the potential of the input electrode of the transistor is increased or decreased. Hence, the resistance of the transistor can be reduced and the efficient charge transfer is allowed.

Preferably, the predetermined voltage is twice as high as the power supply voltage, and the amplitude converting circuit includes a second capacitor, a charge circuit charging the second capacitor to the power supply voltage by supplying power supply potential to one electrode of the second capacitor and supplying a ground potential to another electrode of the second capacitor during a time period in which the reference clock signal is at the second or first potential, and a second switching circuit supplying the power supply potential to another electrode of the second capacitor and connecting one electrode of the second capacitor to one electrode of the first capacitor during a time period in which the reference clock signal is at the first or second potential, and, supplying the ground potential to one electrode of the first capacitor during a time period in which the reference clock signal is at the second or first potential. In this case, the potential of the input electrode of the first transistor can be increased or decreased by an amount corresponding to twice the power supply voltage. Hence the resistance of the first transistor can sufficiently be lowered.

Further preferably, the amplitude converting circuit includes an internal charge pump circuit supplying positive charge to an internal power supply node, a control circuit controlling the charge pump circuit so as to turn a potential of the internal power supply node to a predetermined reference potential, and a second switching circuit connecting one electrode of the first capacitor to the internal power supply node during a time period in which the reference clock signal is at the first or second potential and supplying the ground potential to one electrode of the first capacitor during a time period in which the reference clock signal is at the second or first potential. In this case, the potential of the input electrode of the transistor can be increased or decreased by a desired amount by setting the reference potential at a desired level. Hence, the resistance of the first transistor can sufficiently be lowered.

Still preferably, the charge pump circuit is provided in a non-volatile semiconductor memory device. In this case, even with the decrease in a power supply voltage of the non-volatile semiconductor memory device, a high voltage can easily be generated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a circuit diagram showing a structure of a voltage doubling circuit shown in FIG. 4;

FIGS. 6A and 6B are timing charts referenced for describing an operation of a voltage doubling circuit shown in FIG. 5;

FIGS. 7A to 7F are waveform diagrams of clock signals CLK1 to CLK6 shown in FIGS. 4A and 4B;

FIG. 8 is a waveform diagram referenced for describing an operation of a charge pump unit circuit shown in FIGS. 4A and 4B;

FIGS. 10A and 10B are timing charts referenced for describing an operation of an amplitude converting circuit shown in FIG. 9;

FIGS. 15A to 15F are waveform diagrams of clock signals CLK21 to CLK26 shown in FIGS. 13A and 13B;

FIG. 16 is a waveform diagram showing an operation of a charge pump unit circuit shown in FIGS. 13A and 13B;

FIGS. 20A to 20D are waveform diagrams of clock signals CLK11 to CLK14 shown in FIGS. 19A to 19C.

FIG. 21 is a waveform diagram referenced for describing an operation of a charge pump unit circuit shown in FIGS. 19A to 19C.

FIGS. 23A to 23D are waveform diagrams of clock signals CLK31 to CLK34 shown in FIGS. 22A to 22C.

DESCRIPTION OF THE PREFERRED EMBODIMENTS

First Embodiment

Figure 1:
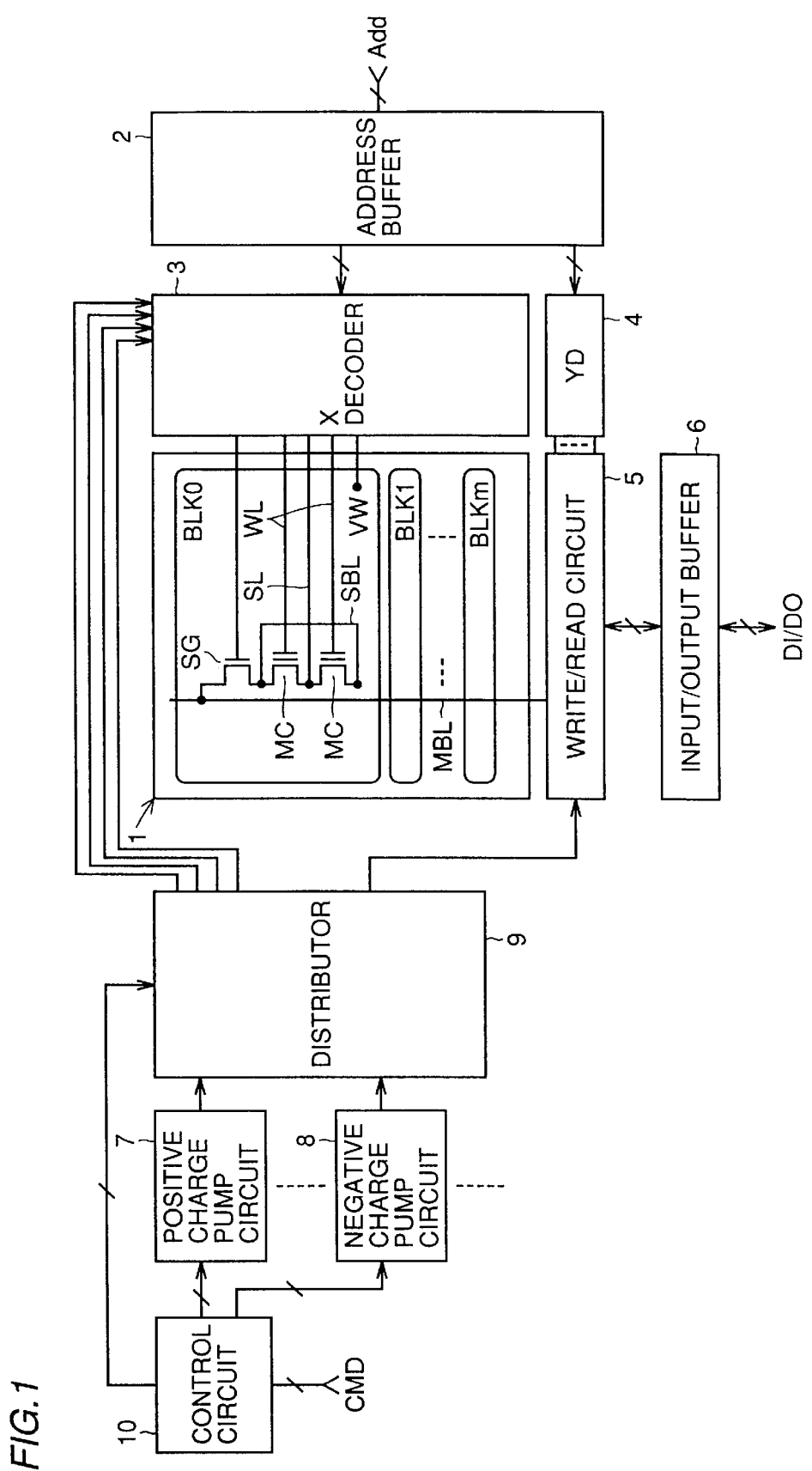
FIG. 1 is a block diagram showing a structure of a flash memory according to the first embodiment of the present invention.

FIG. 1 is a block diagram showing a structure of a flash memory according to the first embodiment of the present invention. With reference to FIG. 1, the flash memory includes a memory array 1, an address buffer 2, an X decoder 3, a Y decoder 4, a write/read circuit 5, an input/output buffer 6, a plurality of positive charge pump circuits 7, a plurality of negative charge pump circuits 8, a distributor 9 and a control circuit 10.

Memory array 1 includes a plurality of memory blocks BLK0–BLKm (where m is a natural number). The plurality of memory blocks BLK0–BLKm are formed on surfaces of a plurality of wells of a semiconductor substrate, respectively.

Each of memory blocks BLK0–BLKm includes a plurality of memory cells MCs arranged in a plurality of rows and a plurality of columns (in FIG. 1, only two rows and one column are shown for simplicity), word lines WLs arranged corresponding to respective rows, source lines SLs arranged corresponding to respective two adjacent rows, sub bit lines SBLs arranged corresponding to respective columns, and select gates SGs (N channel MOS transistor) arranged corresponding to respective rows. In addition, a main bit line MBL is provided corresponding to each column, common to the plurality of memory blocks BLK0–BLKm. Each of sub bit lines SBLs is connected to a main bit line MBL via select gate SG.

Figure 2A:
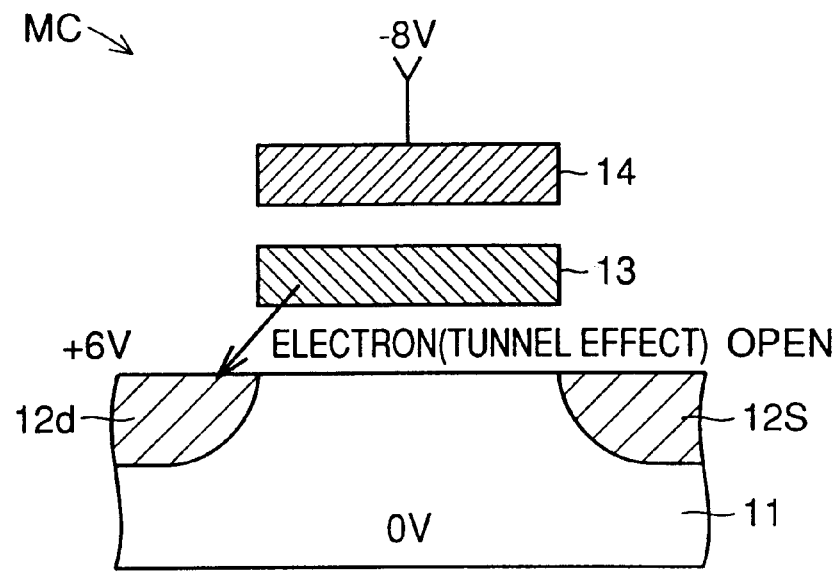
FIGS. 2A and 2B are sectional views referenced for describing a structure and an operation of a memory cell shown in FIG. 1.
Figure 2B:
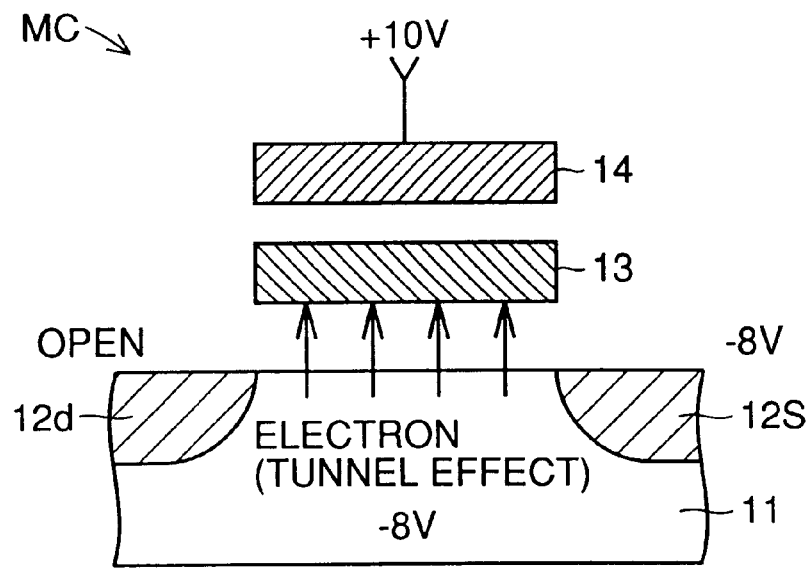

As shown in FIGS. 2A and 2B, each memory cell MC includes a floating gate 13 formed on a surface of a well 11 of the semiconductor substrate with an insulation layer posed therebetween, a control gate 14 formed thereon with an insulation layer posed therebetween, and a source 12s and a drain 12d respectively formed on sides of gates 13 and 14 on the surface of well 11. Control gate 14, drain 12d and source 12s are connected to a word line WL, a sub bit line SBL, and a source line SL corresponding thereto.

Figure 3:
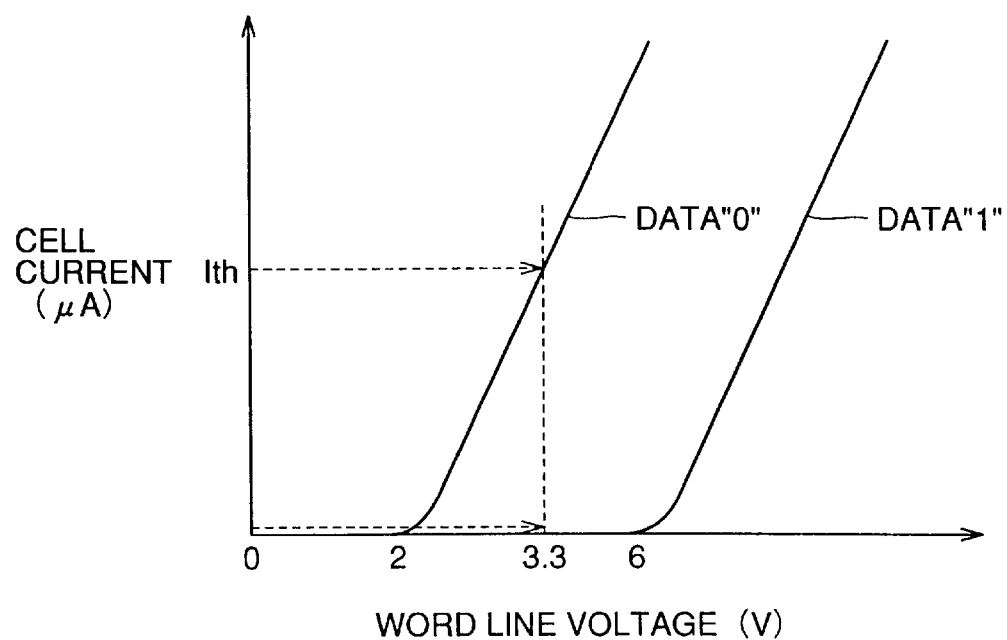
FIG. 3 is a diagram referenced for describing an operation of a memory cell shown in FIGS. 2A and 2B.

At a writing operation, potentials +6V and −8V are applied respectively to drain 12d and control gate 14 of memory cell MC and source 12s is rendered open (floating) and well 11 is connected to ground as shown in an upper column of Table 1. Then, electrons are pulled out from floating gate 13 to drain 12d because of the tunnel effect as shown in FIG. 2A and as a result, threshold voltage Vth of memory cell MC falls down to 2V as shown in FIG. 3. In other words, data "0" is written.

TABLE 1

|  | Drain | Gate | Source | Well |
|---|---|---|---|---|
| Writing | +6 V | −8 V | open | 0 V |
| Erasing | open | +10 V | −8 V | −8 V |
| Reading | 1 V | +3.3 V | 0 V | 0 V |

At an erasing operation, +10V is applied to control gate 14 of memory cell MC, −8V is applied to source 12s and well 11, and drain 12d is rendered open as shown in the middle column of Table 1. Thus, electrons are injected from source 12s and well 11 to floating gate 17 because of the tunnel effect as shown in FIG. 2B. Then, threshold voltage Vth of memory cell MC rises up to about 6V as shown in FIG. 3. In other words, data "1" is written.

At a reading operation, it is detected whether threshold current Ith (normally+several μA) flows between drain 12d and source 12s as shown in FIG. 3, with 1V applied to drain 12d, +3.3V applied to control gate 14, and 0V applied to source 12s and well 11 of memory cell MC as shown in the lower column of Table 1. When data "0" has been written to memory cell MC, current Ith flows, and otherwise current Ith does not flow.

Returning to FIG. 1, address buffer 2 selectively supplies an address signal Add supplied from an external source to X decoder 3 and Y decoder 4. X decoder 3 selects one memory block (BLK0, for example) from the plurality of memory blocks BLK0–BLKm according to address signal Add, renders a select gate SG of the selected memory block, in this case BLK0, conductive and couples a sub bit line SBL of the selected memory block BLK0 to main bit line MBL. Additionally, X decoder 3 turns a well voltage VW of the selected memory block BLK0 to 0V or −8V according to the operation mode, and at the same time, renders the source line SL open, 0V or −8V.

X decoder 3 also selects one word line WL from the plurality of word lines WL according to address signal Add and applies voltage −8V, +10V, or +3.3V to the selected word line WL according to the operation mode. Y decoder 4 selects one main bit line MBL from the plurality of main bit lines MBLs according to address signal Add.

At the writing operation, write/read circuit 5 supplies a write voltage (+6V) to the main bit line MBL selected by Y decoder 4 according to data DI supplied from an external source via input/output buffer 6 and writes data into the memory cell MC selected by decoders 3 and 4. At the reading operation, write/read circuit 5 applies 1V to drain 12d of the memory cell MC selected via the main bit line MBL, the select gate SG, and the sub bit line SB selected by decoders 3 and 4 to detect whether a current flows or not and supplies data DO based on the detection result via input/output buffer as an output.

Charge pump circuits 7 and 8 generate voltage at various levels employed by X decoder 3 and write/read circuit 5 at each of writing, reading, erasing operations. Positive charge pump circuit 7 generates a positive voltage and negative charge pump circuit 8 generates a negative voltage. Distributor 9 distributes voltages generated at charge pump circuits 7 and 8 to X decoder 3 and write/read circuit 5 according to the operation mode. Control circuit 10 selects a operation mode according to a command signal CMD supplied from an external source and controls the flash memory as a whole.

Next, an operation of the flash memory will be described. First, an operation mode is set in response to command signal CMD given to control circuit 10.

At the writing operation, −8V is applied to a word line WL corresponding to a memory cell MC designated by address signal Add. The memory cell MC is connected to a main bit line MBL via a select gate SG and the source line SL is rendered open and well voltage VW is turned to 0V. Under this condition, write/read circuit 5 supplies +6V to the main bit line MBL and data "0" is written into the selected memory cell MC.

At the erasing operation, source line SL and well voltage VW are turned to −8V. Under this condition, voltage of +10V is supplied to a word line WL designated by address signal Add and data in a memory cell MC connected to the word line WL is erased.

At the reading operation, memory cell MC designated by address signal Add is connected to write/read circuit 5 via a sub bit line SBL, a select gate SG and a main bit line MBL, and +3.3V is applied to a word line WL corresponding to the memory cell MC. Data in the memory cell MC is read by write/read circuit 5 and supplied as an output via input/output buffer 6.

Figure 4A:
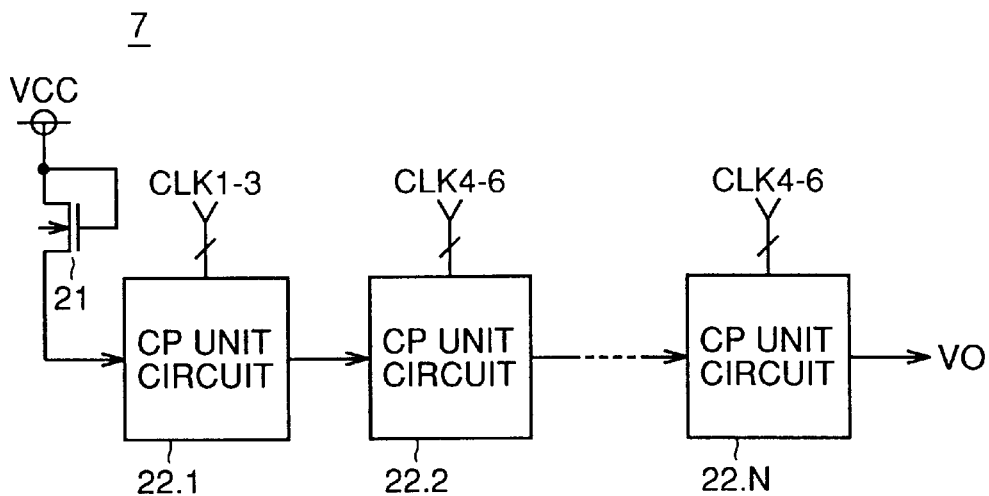
FIGS. 4A and 4B are circuit block diagrams showing a structure of a positive charge pump circuit shown in FIG. 1.

Next, positive charge pump circuit 7, which is a feature of the first embodiment, will be described in detail. As shown in FIG. 4A, positive charge pump circuit 7 includes an N channel MOS transistor 21 and N stages of charge pump unit circuits 22.1–22.N connected in series. N channel MOS transistor 21 is connected between a line of power supply potential VCC and an input node of charge pump unit circuit 22.1 of the first stage, and has a gate connected to the line of power supply potential VCC. N channel MOS transistor 21 operates as a diode and supplies positive charge from the line of power supply potential VCC to the input node of charge pump unit circuit 22.1 of the first stage.

Charge pump unit circuits 22.1, 22.3, . . . , 22.N−1 of odd-numbered stages supply positive charge to charge pump unit circuits 22.2, 22.4, . . . , 22.N of the next stages, respectively, in synchronization with clock signals CLK1–CLK3. Charge pump unit circuits 22.2, 22.4, . . . , 22.N of even-numbered stages supply positive charge to charge pump unit circuit 22.3, 22.5, . . . , 22.N−1 of the next stages and to the output node, respectively, in synchronization with clock signals CLK4–CLK6. The output potential of charge pump unit circuit 22.N of the last stage is an output potential VO of positive charge pump circuit 7.

Figure 4B:
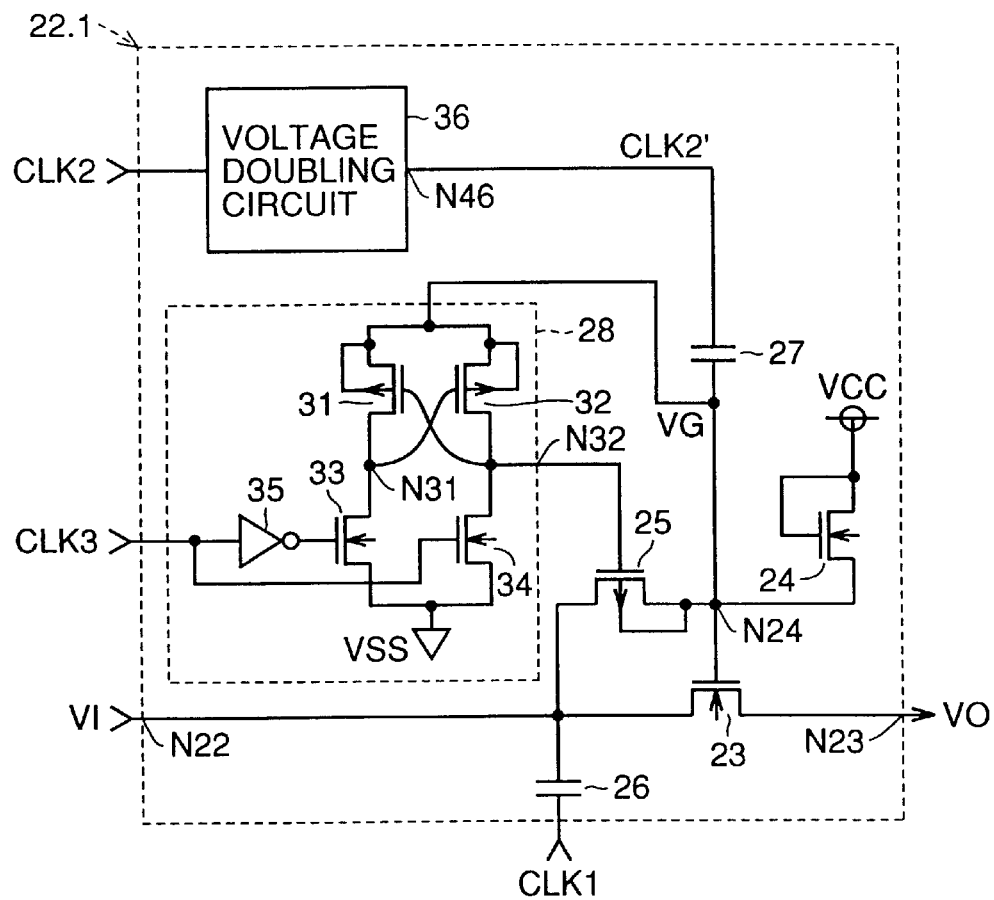

Charge pump unit circuit 22.1 includes N channel MOS transistors 23 and 24, a P channel MOS transistor 25, capacitors 26 and 27, a switching circuit 28 and a voltage doubling circuit 36 as shown in FIG. 4B. N channel MOS transistor 23 is connected between an input node N22 and an output node N23 of charge pump unit circuit 22.1. N channel MOS transistor 24 is connected between the line of power supply potential VCC and a gate (node N24) of N channel MOS transistor 23. The gate of N channel MOS transistor 24 is connected to the line of power supply potential VCC. N channel MOS transistor 24 operates as a diode and supplies positive charge to a node N24.

P channel MOS transistor 25 is connected between input node N22 and node N24 and has a gate connected to an output node N32 of switching circuit 28. Capacitor 26 has one electrode receiving clock signal CLK1 and another electrode connected to input node N22. Capacitor 27 has one electrode receiving an output clock signal CLK2' of voltage doubling circuit 36 and another electrode connected to node N24.

Switching circuit 28 includes P channel MOS transistors 31 and 32, N channel MOS transistors 33 and 34 and an inverter 35. MOS transistors 31 and 33, 32 and 34 are each connected in series between node N24 and a line of ground potential VSS. A gate of P channel MOS transistor 31 is connected to a drain (node N32) of P channel MOS transistor 32 whereas a gate of P channel MOS transistor 32 is connected to a drain (node N31) of P channel MOS transistor 31. Clock signal CLK3 is supplied to a gate of N channel MOS transistor 34 as well as to a gate of N channel MOS transistor 33 via inverter 35.

In a time period during which clock signal CLK3 is at an "L" level, MOS transistors 32 and 33 are conductive and MOS transistors 31 and 34 are non conductive, and the gate of P channel MOS transistor 25 receives potential VG of node N24 via P channel MOS transistor 32. In a time period during which clock signal CLK3 is at an "H" level, MOS transistors 31 and 34 are conductive and MOS transistors 32 and 33 are non conductive, and the gate of P channel MOS transistor 25 receives ground potential VSS via N channel MOS transistor 34.

With reference to FIG. 5, voltage doubling circuit 36 includes inverters 41 and 42, a capacitor 43, P channel MOS transistors 44–46, and N channel MOS transistors 47 and 48. Inverters 41 and 42, capacitor 43 and P channel MOS transistor 46 are connected in series between an input node N41 and an output node N46 of voltage doubling circuit 36. A gate of P channel MOS transistor 46 receives an output of inverter 41.

P channel MOS transistor 44 and N channel MOS transistor 47 are connected in series between a node N43 between capacitor 43 and P channel MOS transistor 46 and the line of ground potential VSS, and each of their gates receives an output of inverter 41. P channel MOS transistor 45 is connected between the line of power supply potential VCC and node N43 and has a gate connected to a node N44 between MOS transistors 44 and 47. N channel MOS transistor 48 is connected between output node N46 and the line of ground potential VSS and has a gate receiving an output of inverter 41.

Clock signal CLK2 is supplied as an input to input node N41. Clock signal CLK2 has the amplitude equal to power supply voltage VCC as shown in FIG. 6A. While clock signal CLK2 is at an "L" level, an output of inverter 41 is at an "H" level and an output of inverter 42 is at an "L" level. Then, P channel MOS transistor 44 becomes non conductive, N channel MOS transistor 47 becomes conductive, node N47 attains "L" level, P channel MOS transistor 45 becomes conductive and node N43 is turned to an "H" level. Thus, capacitor 43 is charged with power supply voltage VCC. In addition, P channel MOS transistor 46 is rendered non conductive and N channel MOS transistor 48 becomes conductive, whereby the potential on output node N46 is turned to an "L" level.

When clock signal CLK2 rises to an "H" level, the output of inverter 41 falls down to an "L" level. Then, P channel MOS transistor 44 becomes conductive, N channel MOS transistor 47 becomes non conductive, whereby node N44 is turned to an "H" level and P channel MOS transistor 45 becomes non conductive. In addition, P channel MOS transistor 46 becomes conductive, and N channel MOS transistor 48 becomes non conductive. At the same time, an output of inverter 42 is turned to an "H" level (power supply potential VCC) and a voltage 2VCC higher than the "H" level by an amount of charge voltage VCC of capacitor 43 is supplied to output node N46. Therefore, the output signal of voltage doubling circuit 36 is a clock signal CLK2' having an amplitude twice that of clock signal CLK2 as shown in FIG. 6B.

Other charge pump unit circuits 22.3, 22.5, . . . , 22.N–1 of odd-numbered stages have the same structure as charge pump unit circuit 22.1. Charge pump unit circuits 22.2, 22.4, . . . , 22.N of odd-numbered stages are same with charge pump unit circuit 22.1 except that clock signals CLK4–CLK6 are employed instead of clock signals CLK1–CLK3.

FIGS. 7A to 7F are waveform diagrams of clock signals CLK1–CLK6 and FIG. 8 is a schematic waveform diagram of potential VI of input node N22, gate potential VG of N channel MOS transistor 23 and potential VO of output node N23 in each of charge pump unit circuits 22.1, 22.3, . . . , 22.N–1. Next with reference to FIGS. 7A–7F and FIG. 8, an operation of positive charge pump circuit 7 will be described.

First with reference to FIGS. 7A–7F, clock signal CLK1 has a predetermined period and the duty factor is 50%. In FIGS. 7A–7F, clock signal CLK1 is at an "H" level from t1 to t6 and at an "L" level from t6 to t11. Other clock signals CLK2 to CLK6 each have the same period with clock signal CLK1. Clock signal CLK3 attains an "L" level at a middle part (t2–t5) of a time period during which clock signal CLK1 is at an "H" level and is at an "H" level in other part.

Clock signal CLK2 attains an "H" level at a middle part (t3–t4) of a time period during which clock signal CLK3 is at an "L" level and is at an "L" level in other part. Clock signals CLK4–CLK6 are signals one half period delayed from clock signal CLK1–CLK3, respectively.

Before t1, clock signals CLK1 and CLK2 are at an "L" level and clock signal CLK3 is at an "H" level. Therefore, in switching circuit 28, MOS transistors 31 and 34 are conductive, MOS transistor 32 and 33 are non conductive, node N32 attains an "L" level and P channel MOS transistor 25 is conductive. In addition, positive charge flows into input node N22 from the line of power supply potential VCC via N channel MOS transistor 24 and P channel MOS transistor 25, and capacitor 26 is charged with power supply voltage VCC. Further, the output clock signal of voltage doubling circuit 36 attains an "L" level and capacitor 27 is charged with power supply voltage VCC.

At t1, clock signal CLK1 is turned from an "L" level to an "H" level. Then the potential of input node N22 is boosted by an amount of power supply voltage VCC via capacitor 26. Potential VI of input node N22 is transferred to node N24 via P channel MOS transistor 25 in a conductive state. Then potential VG of node N24 is also boosted by an amount of power supply voltage VCC.

At t2, clock signal CLK3 is turned from an "H" level to an "L" level. Then, MOS transistors 32 and 33 of switching circuit 28 become conductive and MOS transistors 31 and 34 become non conductive. Then, gate potential VG of an "H" level is supplied to a gate of P channel MOS transistor 25 via P channel MOS transistor 32, and P channel MOS transistor 25 is rendered non conductive.

At t3, clock signal CLK2 is turned from an "L" level to an "H" level. Then, output clock signal CLK2' of voltage doubling circuit 36 rises to the high voltage 2VCC and gate potential VG is boosted accordingly. Then, the resistance of N channel MOS transistor 23 sufficiently is decreased. Then, positive charge is transferred from input node N22 to output node N23 and input potential VI falls and output voltage VO rises.

At t4, clock signal CLK2 falls down to "L" level. Then gate potential VG falls by an amount of 2VCC, increasing the resistance of N channel MOS transistor 23 and reducing the transfer of positive charge.

At t5, clock signal CLK3 attains an "H" level. Then, MOS transistors 31 and 34 of switching circuit 28 become conductive and MOS transistors 32 and 33 become non conductive. A potential of the gate of P channel MOS transistor 25 is turned to an "L" level and P channel MOS transistor 25 becomes conductive. Whereby input node N22 is precharged to an "H" level via MOS transistors 24 and 25. When clock signal CLK1 attains an "L" level at t6, the state returns to the state before t1.

From t6 to t1, clock signals CLK1 and CLK2 are held at an "L" level, clock signal CLK3 is held at an "H" level, and charge pump unit circuits 22.1, 22.3, . . . , 22.N–1 of odd-numbered stages do not operate. During the time period from t6 to t11, charge pump unit circuits 22.2, 22.4, . . . , 22.N of even-numbered stages operate in the same manner with charge pump unit circuits 22.1, 22.3, . . . , 22.N–1 of odd-numbered stages from t1–t6, supplying positive charge of input node N22 to output node N23.

Thus, in positive charge pump circuit 7, charge pump unit circuits 22.1, 22.3, . . . , 22.N–1 of odd-numbered stages and charge pump unit circuits 22.2, 22.4, . . . , 22.N of even-numbered stages alternately operate in synchronization with clock signals CLK1 to CLK6. Positive charge is supplied from each charge pump unit circuit to the next charge pump unit circuit and boosted at each charge pump unit circuit. From charge pump unit circuit 22.N of the last stage, a positive potential at a high level is output.

In this embodiment, clock signal CLK2' having an amplitude double that of clock signal CLK2 is generated by voltage doubling circuit 36 and is utilized for boosting gate potential VG of N channel MOS transistor 23. Hence, compared with the conventional case where clock signal CLK2 is employed for boosting gate potential VG of N channel MOS transistor 103, gate potential VG increases and resistance of N channel MOS transistor 23 decreases. In addition, in this embodiment, P channel MOS transistor 25 is connected between gate and drain of N channel MOS transistor 23 and P channel MOS transistor 25 is controlled to be on/off by switching circuit 28. Therefore, dissimilar to the conventional case where the drain and the gate of N channel MOS transistor 103 are connected via resistance element 104, positive charge would not flow back from the gate of N channel MOS transistor to input node N102 to decrease gate potential VG. Thus, transfer efficiency of positive charge in each of charge pump unit circuits 22.1–22.N increases and a positive voltage of a high level can readily be generated even when power supply voltage VCC of the flash memory is reduced.

Though in this embodiment voltage doubling circuit 36 and switching circuit 28 are provided to each of charge pump unit circuits 22.1–22.N, voltage doubling circuit 36 and switching circuit 28 can be provided commonly to the plurality of charge pump unit circuits. For example, a voltage doubling circuit 36 and a switching circuit 28 may be provided commonly to charge pump unit circuits 22.1, 22.3, . . . , 22.N–1 of odd-numbered stages, whereas a voltage doubling circuit 36 and a switching circuit 28 may be provided commonly to charge pump unit circuits 22.2, 22.4, . . . , 22.N of even-numbered stages.

Though an even number of charge pump unit circuits 22.1–22.N are provided in this embodiment, of course, an odd number of charge pump unit circuits 22.1–22.N–1 can be provided.

Figure 9:
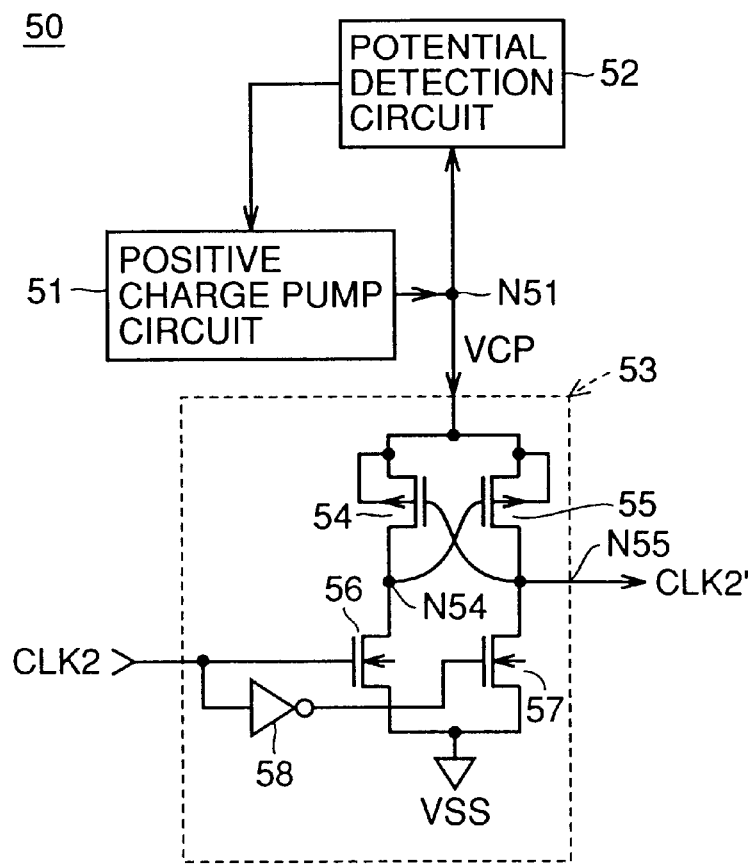
FIG. 9 is a circuit block diagram showing a modification of the first embodiment.

FIG. 9 shows a main portion of a positive charge pump circuit according to a modification of the first embodiment. The positive charge pump circuit is different from positive charge pump circuit 7 of FIG. 4 in that an amplitude converting circuit 50 is employed instead of voltage doubling circuit 36. In FIG. 9, amplitude converting circuit 50 includes a positive charge pump circuit 51, a potential detection circuit 52 and a switching circuit 53.

Positive charge pump circuit 51 is controlled by potential detection circuit 52 and supplies positive charge to an internal power supply node N51. Potential detection circuit 52 controls positive charge pump circuit 51 so that a potential of internal power supply node N51 attains a predetermined high potential VCP. Potential detection circuit 52 stops the operation of positive charge pump circuit 51 in response to the transition of potential of internal power supply node N51 to VCP, and drives positive charge pump circuit 51 in response to the transition of potential of internal power supply node N51 down below VCP.

Switching circuit 53 includes P channel MOS transistors 54 and 55, N channel MOS transistors 56 and 57 and an inverter 58. MOS transistors 54 and 56, 55 and 57 are each connected in series between node N51 and the line of ground potential VSS. A gate of P channel MOS transistor 54 is connected to a drain (node N55) of P channel MOS transistor 55 and a gate of P channel MOS transistor 55 is connected to a drain (node N54) of P channel MOS transistor 54. Clock signal CLK2 is directly applied to a gate of N channel MOS transistor 56 as well as to a gate of N channel MOS transistor 57 via inverter 58.

In a time period during which clock signal CLK2 is at an "L" level, MOS transistors 54 and 57 of switching circuit 53 become conductive rendering node N55 an "L" level. In a time period during which clock signal CLK2 is at an "H" level, MOS transistors 55 and 56 of switching circuit 53 become conductive thus turning a potential on node N55 to a high potential VCP. Therefore, clock signal CLK2' with an amplitude equal to high voltage VCP appears on node N55 as shown in FIGS. 10A and 10B. Clock signal CLK2' is supplied to capacitor 27 instead of output clock signal CLK2' in voltage doubling circuit 36 shown in FIG. 4B. VCP is set to a certain value (3VCC, for example) so as to enable sufficient reduction of resistance of N channel MOS transistor 23 shown in FIG. 4B.

Since the amplitude of clock signal CLK2' can be set to a desired value larger than 2VCC in this embodiment, a high potential VO can be readily generated even when power supply voltage VCC is further reduced.

Second Embodiment

Figure 11A:
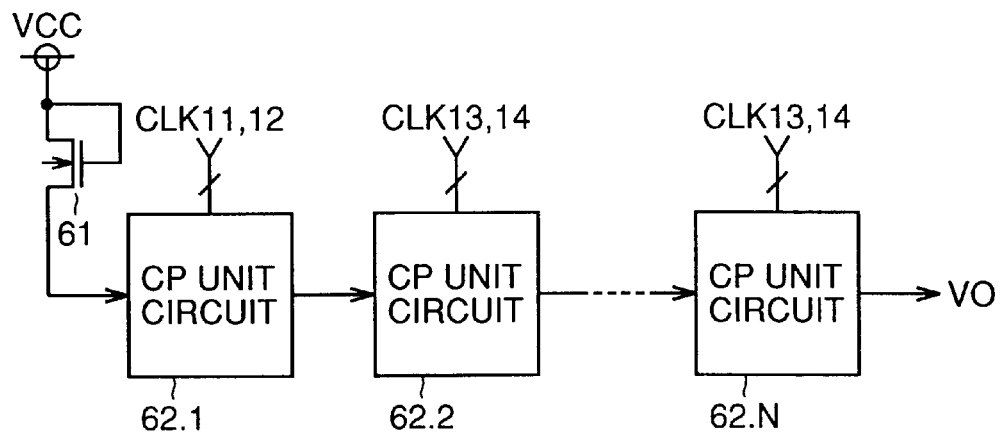
FIGS. 11A and 11B are circuit block diagrams showing a structure of a positive charge pump circuit according to the second embodiment of the present invention.
Figure 11B:
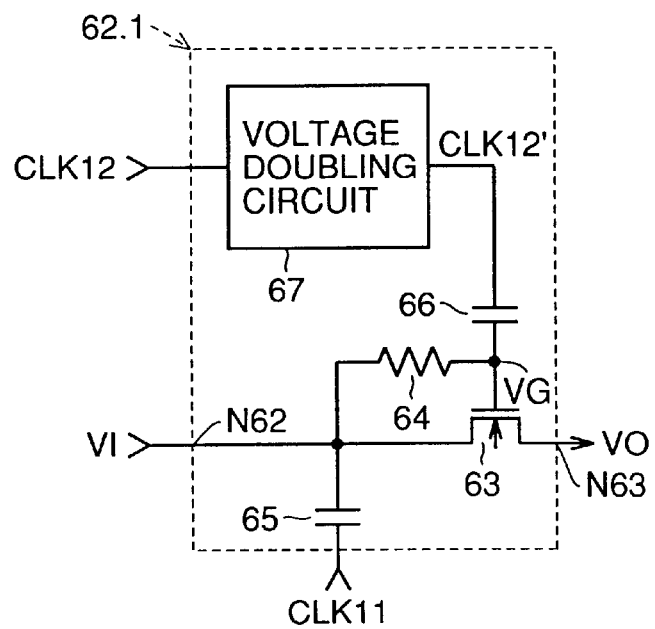

FIGS. 11A and 11B are circuit block diagrams showing a structure of a positive charge pump circuit according to the second embodiment of the present invention.

In FIG. 11A, the positive charge pump circuit includes an N channel MOS transistor 61 and N stages of charge pump unit circuits 62.1–62.N connected in series. N channel MOS transistor 61 is diode connected between a line of power supply potential VCC and an input node of charge pump unit circuit 62.1 of the first stage.

Charge pump unit circuits 62.1, 62.3, . . . , 62.N−1 of odd-numbered stages supply positive charge to charge pump unit circuits 62.2, 62.4, . . . , 62.N of the next stages, respectively, in synchronization with clock signals CLK11 and CLK12. Charge pump unit circuits 62.2, 62.4, . . . , 62.N of even-numbered stages supply positive charge to charge pump unit circuits 62.3, 62.5, . . . , 62.N−1 of the next stages and to an output node, respectively, in synchronization with clock signals CLK13 and CLK14. Clock signals CLK11–CLK14 are same with clock signals shown in FIGS. 20A–20D. An output potential of charge pump unit circuit 62.N of the last stage is an output potential VO of the positive charge pump circuit.

Charge pump unit circuit 62.1 includes an N channel MOS transistor 63, a resistance element 64, capacitors 65 and 66, and a voltage doubling circuit 67 as shown in FIG. 11B. N channel MOS transistor 63 is connected between an input node N62 and an output node N63 of charge pump unit circuit 62.1. Resistance element 64 is connected between a gate of N channel MOS transistor 63 and an input node N62. Capacitor 65 has one electrode receiving clock signal CLK11 and another electrode connected to input node N62. Capacitor 66 has one electrode receiving an output clock signal CLK12' of voltage doubling circuit 67 and another electrode connected to the gate of N channel MOS transistor 63. Voltage doubling circuit 67 generates clock signal CLK12' having an amplitude twice that of clock signal CLK12.

When clock signal CLK1 1 is turned from an "L" level to an "H" level, a potential on input node N62 is boosted by an amount of power supply voltage VCC and potential VI of input node N62 is transferred to a gate of N channel MOS transistor 63 via resistance element 64. Then clock signal CLK12 is turned from an "L" level to an "H" level and output clock signal CLK12' of voltage doubling circuit 67 is turned from an "L" level to high potential 2VCC. As a result, gate potential VG of N channel MOS transistor 63 is boosted by an amount of 2VCC and the resistance of N channel MOS transistor 63 sufficiently is reduced. Then, positive charge of input node N62 is supplied to charge pump unit circuit 62.2 of the next stage via output node N63.

Other charge pump unit circuits 62.3, 62.5, . . . , 62.N−1 of odd-numbered stages are each of the same structure with charge pump unit circuit 62.1. Each of charge pump unit circuits 62.2, 62.4 . . . , 62.N of even-numbered stages are same with charge pump unit circuit 62.1 except that clock signals CLK13 and CLK14 are employed instead of clock signals CLK11 and CLK12.

Figure 19A:
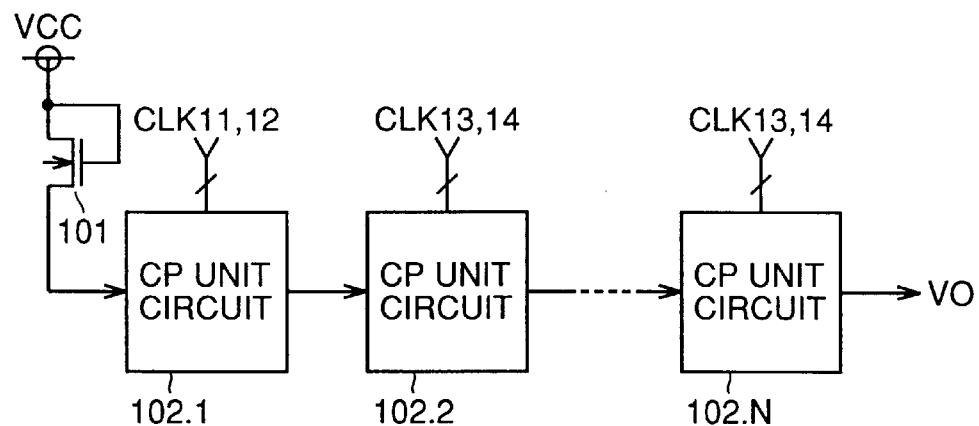
FIGS. 19A to 19C are circuit block diagrams showing a structure of a conventional positive charge pump circuit.
Figure 19B:
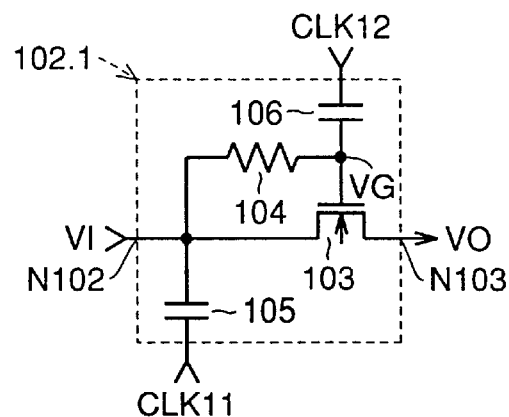
Figure 19C:
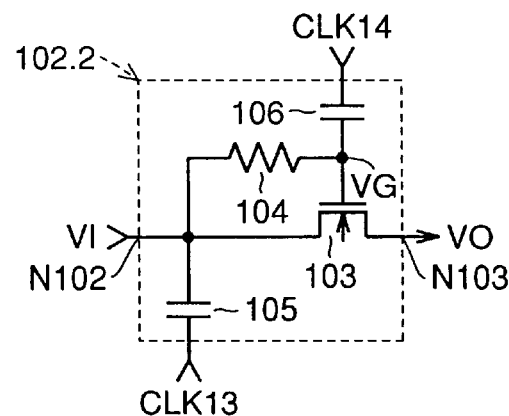

Hence, the difference between the positive charge pump circuit of this embodiment and the conventional positive charge pump circuit shown in FIGS. 19A–19C is that voltage doubling circuit 67 is provided to each of charge pump unit circuits 62.1–62.N. Clock signal CLK12' having an amplitude twice that of clock signal CLK12 is generated by voltage doubling circuit 67 and utilized in boosting gate potential VG of N channel MOS transistor 63. Therefore, compared with the conventional device in which clock signal CLK2 is utilized in boosting gate potential VG of N channel MOS transistor 103, gate potential VG become higher and the resistance of N channel MOS transistor is reduced. Thus, transfer efficiency of positive charge is enhanced in each of charge pump unit circuits 62.1–62.N and a high level positive voltage can be readily generated even when power supply voltage VCC is further reduced.

Compared with the first embodiment, the second embodiment is not favorable in that positive charge leaks to input node N62 via resistance element 64 from the gate of N channel MOS transistor 63 at boosting because resistance element 64 is provided instead of P channel MOS transistor 25. The second embodiment, however, is favorable in that the number of employed clock signals is reduced and the circuit structure is simplified.

Figure 12:
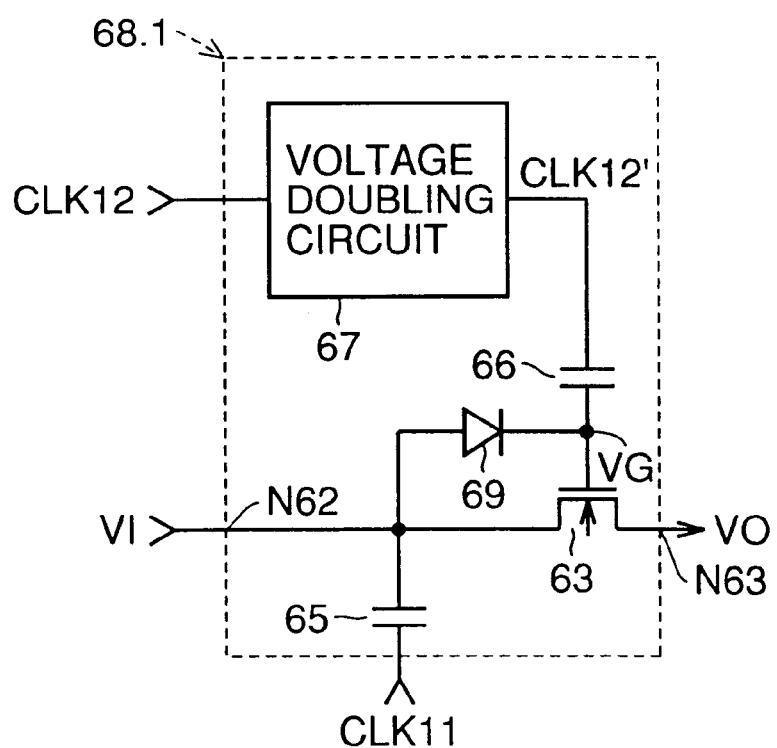
FIG. 12 is a circuit block diagram showing a modification of the second embodiment.

FIG. 12 is a circuit block diagram showing a structure of a charge pump unit circuit 68.1 of the first stage of a positive charge pump circuit according to a modification of the second embodiment. Charge pump unit circuit 68.1 shown in FIG. 12 is different from charge pump unit circuit 62.1 shown in FIG. 11B in that resistance element 64 is replaced with a diode 69. shown in FIG. 11B in that with the replacement of resistance element 64 with diode 69, positive charge in the gate of N channel MOS transistor 63 is blocked at diode 69 and does not leak to input node N62. The modification is, however, not so favorable as charge pump unit circuit 62.1 shown in FIG. 11B where gate potential VG becomes equal to input potential VI when clock signal CLK11 attains an "H" level. In the modification, when clock signal CLK11 attains an "H" level, gate potential VG is boosted only up to a potential VI−Vd, where Vd is a diffusion potential of diode 69 and VI is a potential of input node N62.

Third Embodiment

Figure 13A:
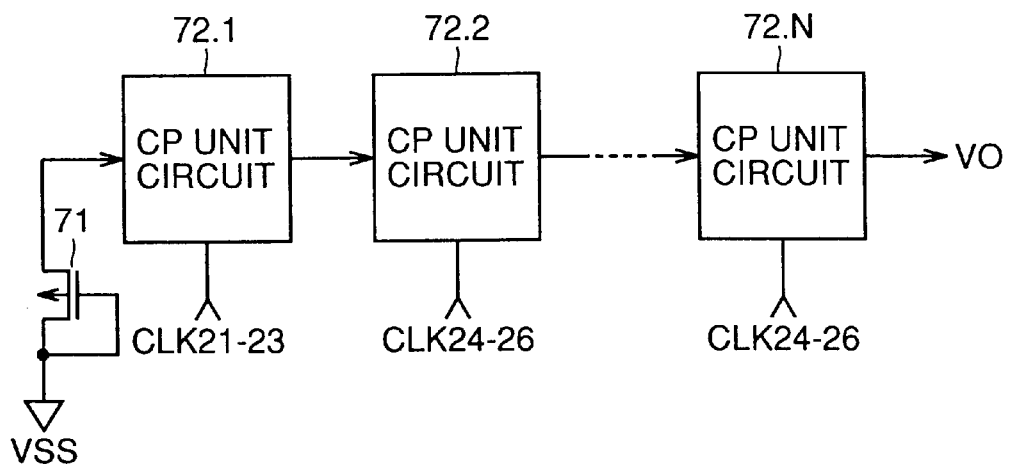
FIGS. 13A and 13B are circuit block diagrams showing a structure of a negative charge pump circuit according to the third embodiment of the present invention.
Figure 13B:
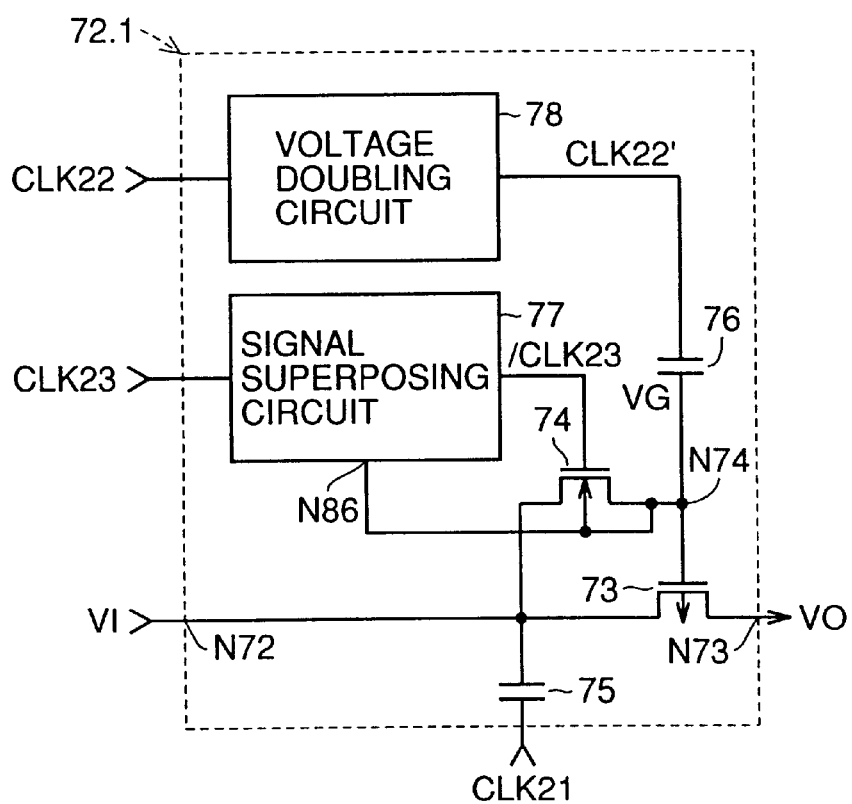
Figure 14:
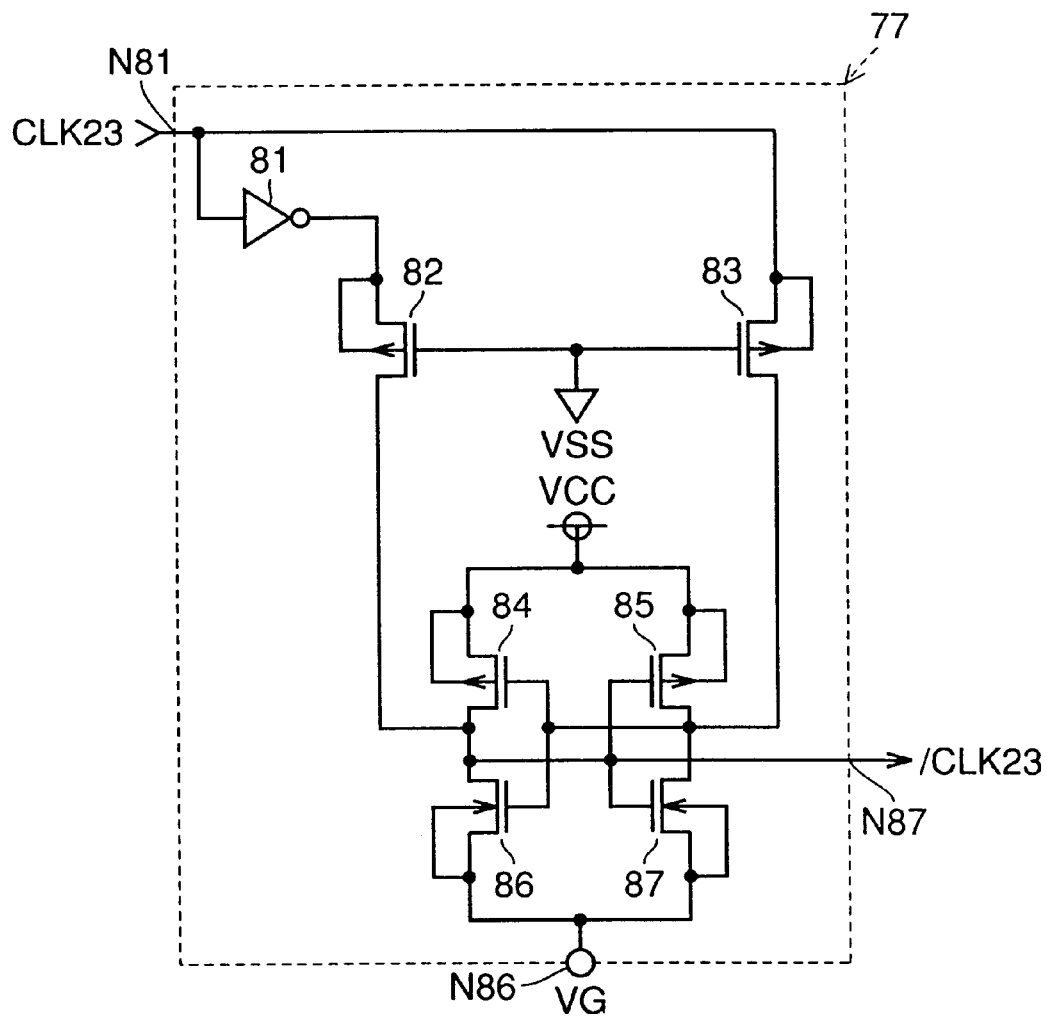
FIG. 14 is a circuit diagram showing a structure of a signal superposing circuit shown in FIGS. 13A and 13B.

FIGS. 13A and 13B are circuit block diagrams showing a structure of negative charge pump circuit according to the third embodiment of the present invention. In FIG. 13A, the negative charge pump circuit includes a P channel MOS transistor 71 and N stages of charge pump unit circuits 72.1–72.N connected in series. P channel MOS transistor 71 is connected between a line of ground potential VSS and an input node of charge pump unit circuit 72.1 of the first stage and has a gate connected to the line of ground potential VSS. P channel MOS transistor 71 operates as a diode and supplies negative charge from the line of ground potential VSS to the input node of charge pump unit circuit 72.1 of the first stage.

Charge pump unit circuits 72.1, 72.3, . . . , 72.N−1 of odd-numbered stages supply negative charge to charge pump unit circuits 72.2, 72.4, . . . , 72.N of the next stages, respectively, in synchronization with clock signals CLK21–CLK23. Charge pump unit circuits 72.2, 72.4, . . . , 72.N of even-numbered stages supply negative charge to charge pump unit circuits 72.3, 72.5, . . . , 72.N−1 of the next stages and to an output node, respectively, in synchronization with clock signals CLK24–CLK26. An output potential of charge pump unit circuit 72.N of the last stage is an output potential VO of the negative charge pump circuit.

As shown in FIG. 13B, charge pump unit circuit 72.1 includes a P channel MOS transistor 73, an N channel MOS transistor 74, capacitors 75 and 76, a signal superposing circuit 77, and a voltage doubling circuit 78. P channel MOS transistor 73 is connected between an input node N72 and an output node N73 of charge pump unit circuit 72.1. N channel MOS transistor 74 is connected between a gate (node N74) of P channel MOS transistor 73 and an input node N72 and has a gate receiving output clock signal /CLK23 of signal superposing circuit 77.

Capacitor 75 has one electrode receiving clock signal CLK21 and another electrode connected to input node N72. Capacitor 76 has one electrode receiving output clock signal CLK22' of voltage doubling circuit 78 and another electrode connected to node N74.

Signal superposing circuit 77 includes an inverter 81, P channel MOS transistors 82–85 and N channel MOS transistors 86 and 87. MOS transistors 84 and 86, 85 and 87 are each connected in series between a line of power supply potential VCC and a node N86. Node N86 is connected to node N74 and a well of N channel MOS transistor 74. Gates of MOS transistors 84 and 86 and a drain of MOS transistor 85 are commonly connected. Gates of MOS transistors 85 and 87 and a drain of MOS transistor 84 are connected to output node N87. Inverter 81 and P channel MOS transistor 82 are connected between an input node N81 and a drain (node N87) of P channel MOS transistor 84, and P channel MOS transistor 83 is connected between input node N81 and a drain of P channel MOS transistor 85. Gates of P channel MOS transistors 82 and 83 are connected to ground. Each of P channel MOS transistors 82 and 83 operates as a diode and prevents a flow back of current to input node N81. Clock signal CLK23 is supplied to input node N81.

In a time period during which clock signal CLK23 is at an "L" level, MOS transistors 84 and 87 are conductive and MOS transistors 85 and 86 are non conductive, rendering a potential of an output node N87 an "H" level. In a time period during which clock signal CLK23 is at an "H" level, MOS transistors 85 and 86 are conductive and MOS transistors 84 and 87 are non conductive, rendering a potential of output node N87 potential VG of node N86. Therefore, a signal /CLK23 produced by inverting clock signal CLK23 is applied between the gate and the source of N channel MOS transistor 74 shown in FIG. 13.

Voltage doubling circuit 78 generates clock signal CLK22' by doubling an amplitude of clock signal CLK22.

Other charge pump unit circuit 72.3, 72.5, . . . , 72.N–1 of odd-numbered stages are each of the same structure with charge pump unit circuit 72.1. Charge pump unit circuits 72.2, 72.4, . . . ,72.N of even-numbered stages are each same with charge pump unit circuit 72.1 except that clock signals CLK24–CLK26 are employed instead of clock signals CLK21–CLK23.

FIGS. 15A–15F are waveform diagrams of clock signals CLK21–CLK26. FIG. 16 is a schematic waveform diagram of potential VI of input node N72, gate potential VG of P channel MOS transistor 73 and potential VO of output node N73 in each of charge pump unit circuits 72.1, 72.3, . . . , 72.N–1 of odd-numbered stages. Next, an operation of the negative charge pump circuit will be described with reference to FIGS. 15A–15F and FIG. 16.

With reference to FIGS. 15A–15F, clock signal CLK21 has a predetermined period and the duty factor is 50%. In FIGS. 15A–15F, clock signal CLK21 is at an "L" level from t1 to t6 and at an "H" level from t6 to t11. Other clock signals CLK22–CLK26 each have the same period with clock signal CLK21. Clock signal CLK23 is at an "H" level in a middle part(t2–t5) of a time period during which clock signal CLK21 is at an "L" level, and is at an "H" level in other part. Clock signal CLK22 is at an "L" level in a middle part (t3–t4) of a time period during which clock signal CLK23 is at an "H" level, and is at an "H" level in other part. Clock signals CLK24–CLK26 are signal one half period delayed from clock signals CLK21–CLK23, respectively.

Before t1, clock signals CLK21 and CLK22 are at an "H" level and clock signal CLK23 is at an "L" level. Hence, clock signal /CLK23 is at an "H" level and N channel MOS transistor 74 is conductive. In addition, capacitors 75 and 76 are charged with power supply voltage –VCC and high voltage –2VCC, respectively.

At t1, clock signal CLK21 is turned from an "H" level to an "L" level. Then a potential of input node N72 is decreased by an amount of power supply voltage VCC via capacitor 75. Potential VI of input node N72 is transferred to node N70 via N channel MOS transistor 74 in a conductive state, and potential VG of node N70 is also decreased by the amount of power supply voltage VCC.

At t2, clock signal CLK23 is turned from an "L" level to an "H" level. Then, MOS transistors 85 and 86 of signal superposing circuit 77 become conductive and MOS transistors 84 and 87 become non conductive, rendering a gate potential and a source potential of N channel MOS transistor 74 equal to each other. Then N channel MOS transistor 74 becomes non conductive.

At t3, clock signal CLK22 is turned from an "H" level to an "L" level. Then an output clock signal CLK22' of voltage doubling circuit 78 is turned from high potential 2VCC to an "L" level. Accordingly, gate potential VG is reduced by the same amount. Then the resistance of P channel MOS transistor 73 sufficiently is reduced, and negative charge is transferred from input node N72 to output node N73. Input potential VI rises and output potential VO falls.

At t4, clock signal CLK22 is turned to an "H" level. Then gate potential VG is boosted by the amount of 2VCC, the resistance of P channel MOS transistor 73 is increased and transfer of negative charge decreases.

At t5, clock signal CLK23 is turned to an "L" level. Then, MOS transistors 84 and 87 of signal superposing circuit 77 become conductive and MOS transistors 85 and 86 become non conductive, rendering clock signal /CLK23 an "H" level and MOS transistor 74 conductive. When clock signal CLK21 attains an "H" level at t6, the state returns to the state before t1.

From t6 to t11, clock signals CLK21 and CLK22 are held at an "H" level, clock signal CLK23 is held at an "L" level and charge pump unit circuits 72.1, 72.3, . . . , 72.N–1 of odd-numbered stages do not operate. From t6 to t11, charge pump unit circuits 72.2, 72.4, . . . , 72.N of even-numbered stages operate in the same manner as charge pump unit circuits 72.1, 72.3, . . . , 72.N–1 of odd-numbered stages from t1 to t6 and supplies negative charge of input node N72 to output node N73.

Thus, in the negative charge pump circuit, charge pump unit circuits 72.1, 72.3, . . . , 72.N–1 of odd-numbered stages and charge pump unit circuits 72.2, 72.4, . . . , 72.N of even-numbered stages alternately operate in synchronization with clock signals CLK21–CLK26. Negative charge is supplied from each charge pump unit circuit to a charge pump unit circuit of the next stage and the negative charge is reduced in each charge pump unit circuit. Charge pump unit circuit 72.N of the last stage outputs a high negative potential.

In this embodiment, clock signal CLK22' having an amplitude twice that of clock signal CLK22 is generated by voltage doubling circuit 78 and utilized to pull down gate potential VG of P channel MOS transistor 73. Therefore, compared with the conventional case in which clock signal CLK22 is utilized to pull down gate potential VG of P channel MOS transistor 113, gate potential VG is lower and the resistance of the P channel MOS transistor decreases. In addition, in this embodiment, N channel MOS transistor 74 is connected between the gate and the drain of P channel MOS transistor 73 and is controlled to be on/off by signal superposing circuit 77. Therefore, negative charge of P channel MOS transistor 113 would not flow back to input node N112 to increase gate potential as in the conventional case where the gate and the drain of P channel MOS transistor 113 are connected by resistance element 114. Hence, transfer efficiency of negative charge in each of charge pump unit circuits 72.1–72.N is improved and a high negative voltage can be readily generated even when power supply voltage VCC in the flash memory is further reduced.

Though in this embodiment, voltage doubling circuit 78 and signal superposing circuit 77 are provided for each of charge pump unit circuits 72.1–72.N, a voltage doubling circuit 78 and a signal superposing circuit 77 can be provided commonly to the plurality of charge pump unit circuits. For example, a voltage doubling circuit 78 and a signal superposing circuit 77 can be provided commonly to charge pump unit circuits 72.1, 72.3, ... , 72.N–1 of odd-numbered stages, and, a voltage doubling circuit 78 and a signal superposing circuit 77 can be provided commonly to charge pump unit circuits 72.2, 72.4, ... , 72.N of even-numbered stages.

Though in this embodiment, an even number of charge pump unit circuits 72.1–72.N are provided, of course an odd number of charge pump unit circuits 72.1–72.N–1 can be provided.

In addition, voltage doubling circuit 78 can be replaced with amplitude converting circuit 50 as shown in FIG. 9.

Fourth Embodiment

Figure 17A:
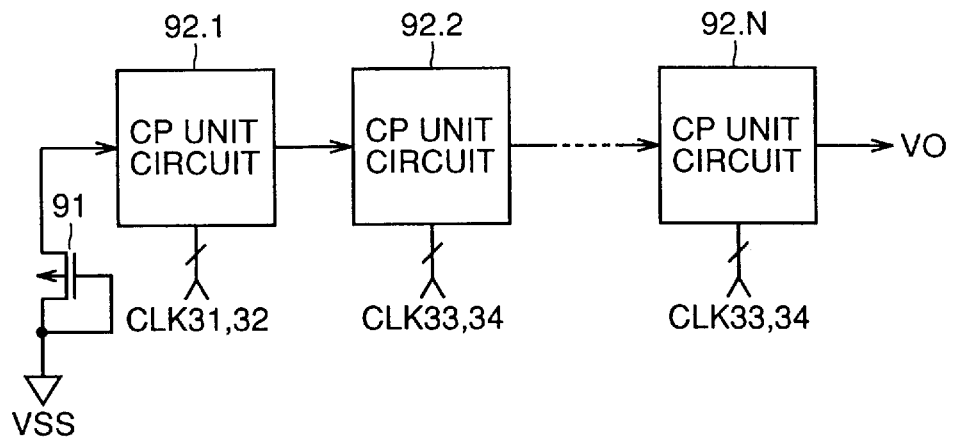
FIGS. 17A and 17B are circuit block diagrams showing a structure of a negative charge pump circuit according to the fourth embodiment of the present invention.
Figure 17B:
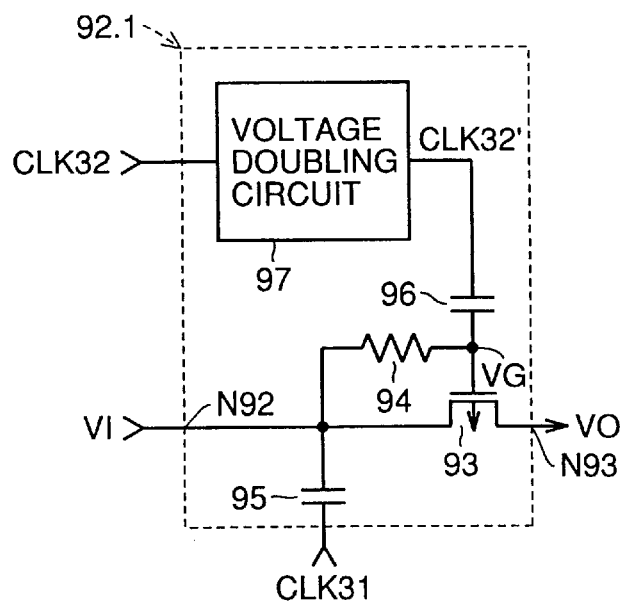

FIGS. 17A and 17B are circuit block diagrams showing a structure of a negative charge pump circuit according to the fourth embodiment of the present invention.

In FIG. 17A, the negative charge pump circuit includes a P channel MOS transistor 91 and N stages of charge pump unit circuits 92.1–92.N connected in series. P channel MOS transistor 91 is diode connected between an input node N92 of charge pump unit circuit 92.1 of the first stage and a line of ground potential VSS.

Charge pump unit circuits 92.1, 92.3, ... , 92.N–1 of odd-numbered stages supply negative charge to charge pump unit circuits 92.2, 92.4, ... , 92.N of the next stages, respectively, in synchronization with clock signals CLK31 and CLK32. Charge pump unit circuits 92.2, 92.4, ... , 92.N of even-numbered stages supply negative charge to charge pump unit circuits 92.3, 92.5, ... , 92.N–1 of the next stages, respectively, in synchronization with clock signals CLK33 and CLK34. Clock signals CLK31–CLK34 are the same with signals shown in FIGS. 23A–23D. An output potential of charge pump unit circuit 92.N of the last stage is an output potential VO of the negative charge pump circuit.

Charge pump unit circuit 92.1 includes a P channel MOS transistor 93, a resistance element 94, capacitors 95 and 96 and a voltage doubling circuit 97 as shown in FIG. 17B. P channel MOS transistor 93 is connected between an input node N92 and an output node N93 of charge pump unit circuit 92.1. Resistance element 94 is connected between a gate of P channel MOS transistor 93 and input node N92. Capacitor 95 has one electrode receiving clock signal CLK31 and another electrode connected to input node N92. Capacitor 96 has one electrode receiving an output clock signal CLK32' of voltage doubling circuit 97 and another electrode connected to the gate of P channel MOS transistor 93. Voltage doubling circuit 97 generates a clock signal CLK32' having an amplitude twice that of clock signal CLK32.

When clock signal CLK31 is turned from an "H" level to an "L" level, an potential of input node N92 falls by an amount of power supply voltage VCC and potential VI of input node N92 is transferred to the gate of N channel MOS transistor 93 via resistance element 94. Then, as clock signal CLK32 is turned from an "H" level to an "L" level, output clock signal CLK32' of voltage doubling circuit 97 is turned from a high potential 2VCC to an "L" level, whereby a gate potential VG of P channel MOS transistor 93 is reduced by the amount of 2VCC. Therefore the resistance of P channel MOS transistor 93 sufficiently is decreased. Hence, negative charge of input node N92 is supplied to charge pump unit circuit 92.2 of the next stage via output node N93.

Other charge pump unit circuits 92.3, 92.5, ... , 92.N–1 of odd-numbered stages are each of the same structure with charge pump unit circuit 92.1. Charge pump unit circuits 92.2, 92.4, ... , 92.N of even-numbered stages are same with charge pump unit circuit 92.1 except that clock signals CLK33 and CLK34 are employed instead of clock signals CLK31 and CLK32.

Figure 22A:
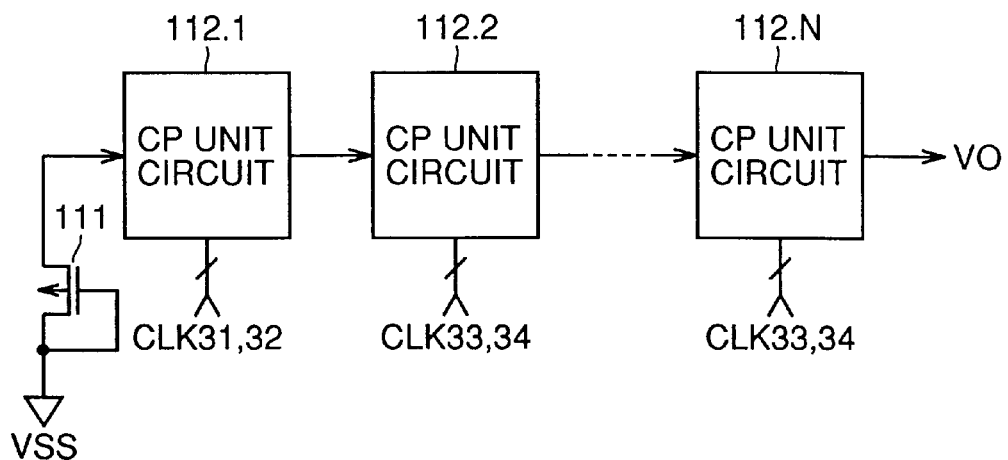
FIGS. 22A to 22C are circuit block diagrams showing a structure of a conventional negative charge pump circuit .
Figure 22B:
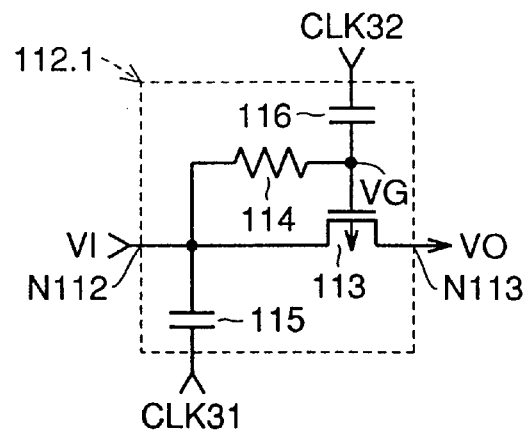
Figure 22C:
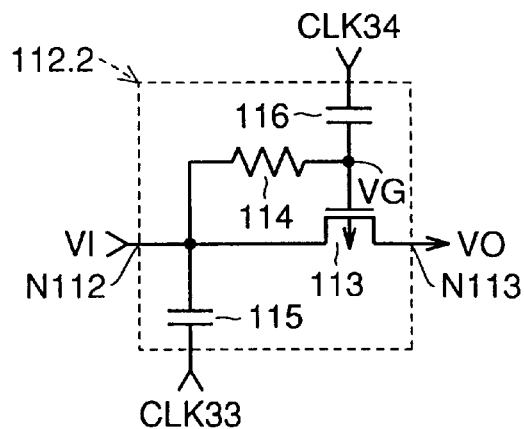
Figure 24:
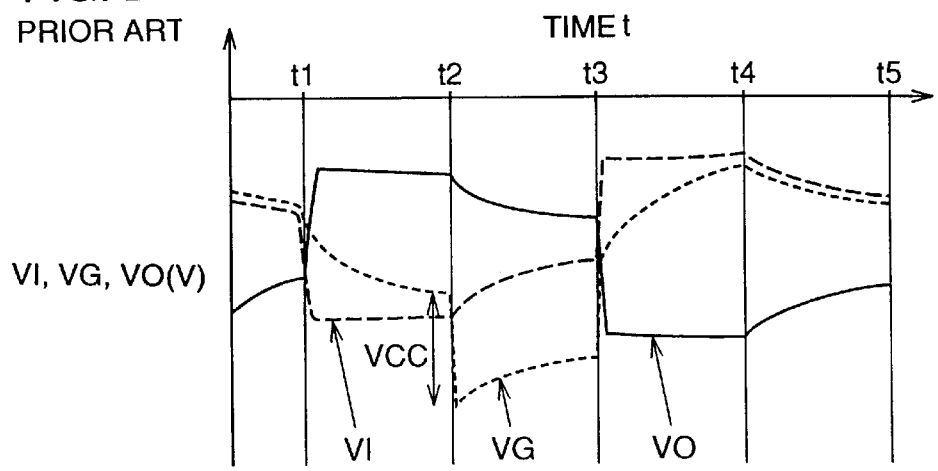
FIG. 24 is a waveform diagram showing an operation of a charge pump unit circuit shown in FIGS. 22A to 22C.

Therefore the difference between the negative charge pump circuit of this embodiment and the conventional negative charge pump circuit shown in FIGS. 22A–22C is that voltage doubling circuit 97 is provided to each of charge pump unit circuits 92.1–92.N. Clock signal CLK32' having an amplitude twice that of clock signal CLK32 is generated by voltage doubling circuit 97 and utilized in pulling down gate potential VG of P channel MOS transistor 93. Therefore, compared with the conventional case where clock signal CLK32 is utilized for pulling down gate potential VG of P channel MOS transistor 113, gate potential VG is decreased and the resistance of the P channel MOS transistor is reduced. Thus, the transfer efficiency of the negative charge in each of charge pump unit circuits 92.1–92.N is increased and a high negative voltage can be easily generated even when power supply voltage VCC of the flash memory is reduced.

Compared with the third embodiment, the fourth embodiment is not favorable in that negative charge leaks to input node N92 via resistance element 94 when the voltage is decreased, because N channel MOS transistor 74 is replaced with resistance element 94. The fourth embodiment is favorable, however, in that the number of clock signals CLK can be reduced and the circuit structure can be simplified.

Though in this fourth embodiment, voltage doubling circuit 97 is provided for each of charge pump unit circuits 92.1–92.N, a voltage doubling circuit 97 can be provided commonly to the plurality of charge pump unit circuits. In addition, voltage doubling circuit 97 can be replaced with amplitude converting circuit 50 as shown in FIG. 9.

In addition, though an even number of charge pump unit circuits 92.1–92.N are provided in the fourth embodiment, an odd number of charge pump unit circuits 92.1–92.N–1 can be provided.

Figure 18:
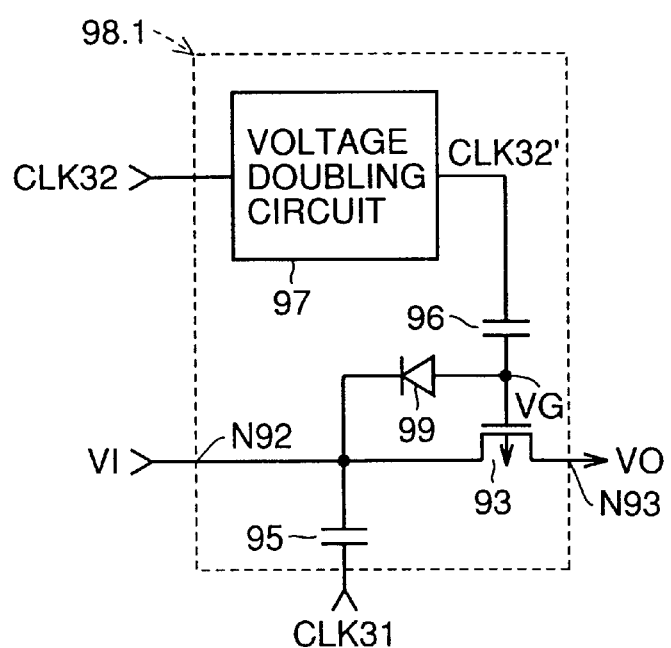
FIG. 18 is a circuit block diagram showing a modification of the fourth embodiment.

FIG. 18 is a circuit block diagram showing a structure of a charge pump unit circuit 98.1 of the first stage of a negative charge pump circuit according to a modification of the fourth embodiment. Charge pump unit circuit 98.1 shown in FIG. 18 is different from charge pump unit circuit 92.1 shown in FIG. 17B in that resistance element 94 is replaced with diode 99. Diode 99 has an anode connected to a gate of P channel MOS transistor 93 and a cathode connected to an input node N92.

In this modification, negative charge from the gate of P channel MOS transistor 93 is blocked by diode 99 and do not leak out to input node N92 because resistance element 94 is replaced with diode 99. In this point, this modification is favorable over charge pump unit circuit 92.1 of FIG. 17B. The modification is less favorable than charge pump unit circuit 92.1 shown in FIG. 17B where gate potential VG becomes equal to input potential VI when clock signal CLK3 1 is turned to an "L" level, because in the modification, gate potential VG is pulled down only down to the level of VI+Vd where VI is potential of input node N92 and Vd is diffusion potential of diode 99.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A charge pump circuit transferring positive charge or negative charge of an input node to an output node in synchronization with a clock signal, for generating a voltage higher or lower than a power supply voltage, comprising:
   a first transistor of a first conductivity type connected between said input node and said output node;
   a second transistor of a second conductivity type connected between said input node and an input electrode of said first transistor;
   a first driving circuit pulling down or pulling up a potential of said input node by an amount of a predetermined first voltage during a first time period of each period of said clock signal;
   a first switching circuit turning said second transistor non conductive by connecting an input electrode of said second transistor and the input electrode of said first transistor during a second time period in said first time period and turning said second transistor conductive by supplying an activation potential to the input electrode of said second transistor during a time period other than the second time period; and
   a second driving circuit, turning said first transistor conductive by pulling up or pulling down a potential of the input electrode of said first transistor to adjust a potential difference between the input electrode of said first transistor and said input node so that the potential difference is larger than said power supply voltage during a third time period in said second time period and, transferring positive charge or negative charge of said input node to the output node.

2. The charge pump circuit according to claim 1, wherein said second driving circuit adjusts the potential difference between the input electrode of said first transistor and said input node so that the potential difference is twice as large as said power supply voltage.

3. The charge pump circuit according to claim 2, wherein said predetermined second voltage is twice as high as said power supply voltage, and said amplitude converting circuit includes:
   a second capacitor,
   a charge circuit charging said second capacitor to the level of power supply voltage by supplying power supply potential to one electrode of said second capacitor and supplying a ground potential to another electrode of said second capacitor during a time period in which said reference clock signal is at said second or first potential, and
   a second switching circuit supplying said power supply potential to another electrode of said second capacitor charged by said charge circuit and connecting one electrode of said second capacitor to one electrode of said first capacitor in a time period in which said reference clock signal is at said first or second potential, and supplying said ground potential to one electrode of said first capacitor during a time period in which said reference clock signal is at said second or first potential.

4. A charge pump circuit transferring positive charge or negative charge of an input node to an output node in synchronization with a clock signal, comprising:
   a first transistor of a first conductivity type connected between said input node and said output node;
   a second transistor of a second conductivity type connected between said input node and an input electrode of said first transistor;
   a first driving circuit pulling down or pulling up a potential of said input node by an amount of a predetermined first voltage during a first time period of each period of said clock signal;
   a first switching circuit turning said second transistor non conductive by connecting an input electrode of said second transistor and the input electrode of said first transistor during a second time period in said first time period and turning said second transistor conductive by supplying an activation potential to the input electrode of said second transistor during a time period other than the second time period; and
   a second driving circuit turning said first transistor conductive by pulling up or pulling down a potential of the input electrode of said first transistor by an amount of a predetermined second voltage during a third time period in said second time period and transferring positive charge or negative charge of said input node to the output node; wherein
   said second driving circuit includes:
   an amplitude converting circuit receiving a reference clock signal having same period with said clock signal, being at a first potential during said third time period in each period and at a second potential during a time period other than said third time period and having an amplitude equal to said power supply voltage, and converting the amplitude of the reference clock signal to said predetermined second voltage and supplying the result as an output, and
   a first capacitor having one electrode receiving an output clock signal of said amplitude converting circuit and another electrode connected to the input electrode of said first transistor; and
   said amplitude converting circuit includes:
   an internal charge pump circuit supplying positive charge to an internal power supply node,
   a control circuit controlling said internal charge pump circuit so as to turn a potential of said internal power supply node to a predetermined reference potential, and
   a second switching circuit connecting one electrode of said first capacitor to said internal power supply node during a time period in which said reference clock signal is at said first or second potential and supplying said ground potential to one electrode of said first capacitor during a time period in which said reference clock signal is at said second or first potential.

5. The charge pump circuit according to claim 1, wherein said charge pump circuit is provided in a non-volatile semiconductor memory device.

6. A charge pump circuit transferring positive charge or negative charge of an input node to an output node in synchronization with a clock signal, comprising:

a first transistor connected between said input node and said output node;

a resistance element connected between said input node and an input electrode of said transistor;

a first driving circuit pulling down or pulling up a potential of said input node by an amount of a power supply voltage during a first time period of each period of said clock signal; and a second driving circuit turning said first transistor conductive by pulling up or pulling down a potential of the input electrode of said first transistor by an amount of a predetermined voltage at least twice as high as said power supply voltage during a second time period in said first time period and transferring positive charge or negative charge of said input node to the output node; and said second driving circuit including:

an amplitude converting circuit receiving a reference clock signal having the same period with said clock signal, being at a first potential during said second time period of each period and at a second potential during a time period other than said second time period and having an amplitude equal to said power supply voltage, and, converting the amplitude of the reference clock signal to said predetermined voltage and supplying the result as an output, and a first capacitor having one electrode receiving an output clock signal of said amplitude converting circuit and another electrode connected to the input electrode of said transistor; wherein said predetermined voltage is twice as high as said power supply voltage, and said amplitude converting circuit includes:

a second capacitor, a charge circuit charging said second capacitor to the level of power supply voltage by supplying power supply potential to one electrode of said second capacitor and supplying a ground potential to another electrode of said second capacitor during a time period in which said reference clock signal is at said second or first potential, and a second switching circuit supplying said power supply potential to another electrode of said second capacitor charged by said charge circuit and connecting one electrode of said second capacitor to one electrode of said first capacitor during a time period in which said reference clock signal is at said first or second potential, and, supplying said ground potential to one electrode of said first capacitor during a time period in which said reference clock signal is at said second or first potential.

7. A charge pump circuit transferring positive charge or negative charge of an input node to an output node in synchronization with a clock signal, comprising:

a transistor connected between said input node and said output node;

a resistance element connected between said input node and an input electrode of said transistor;

a first driving circuit pulling down or pulling up a potential of said input node by an amount of a power supply voltage during a first time period of each period of said clock signal; and a second driving circuit turning said transistor conductive by pulling up or pulling down a potential of the input electrode of said first transistor by an amount of a predetermined voltage higher than said power supply voltage during a second time period in said first time period and transferring positive charge or negative charge of said input node to the output node; and said second driving circuit including an amplitude converting circuit receiving a reference clock signal having the same period with said clock signal, being at a first potential during said second time period of each period and at a second potential during a time period other than said second time period and having an amplitude equal to said power supply voltage, and, converting the amplitude of the reference clock signal to said predetermined voltage and supplying the result as an output, and a first capacitor having one electrode receiving an output clock signal of said amplitude converting circuit and another electrode connected to the input electrode of said transistor; wherein said amplitude converting circuit includes:

an internal charge pump circuit supplying positive charge to an internal power supply node, a control circuit controlling said charge pump circuit so as to turn a potential of said internal power supply node to a predetermined reference potential, and a second switching circuit connecting one electrode of said first capacitor to said internal power supply node during a time period in which said reference clock signal is at said first or second potential and supplying said ground potential to one electrode of said first capacitor during a time period in which said reference clock signal is at said second or first potential.

8. A charge pump circuit transferring positive charge or negative charge of an input node to an output node in synchronization with a clock signal, comprising:

a transistor connected between said input node and said output node;

a diode element connected between said input node and an input electrode of said transistor for preventing a flow of positive charge or negative charge of the input electrode of said transistor to said input node;

a first driving circuit pulling down or pulling up a potential of said input node by an amount of a power supply voltage during a first time period of each period of said clock signal; and a second driving circuit turning said first transistor conductive by pulling up or pulling down a potential of the input electrode of said first transistor by an amount of a predetermined voltage at least twice as high as said power supply voltage during a second time period in said first time period and transferring positive charge or negative charge of said input node to the output node; and said second driving circuit including:

an amplitude converting circuit receiving a reference clock signal having the same period with said clock signal, being at a first potential during said second time period of each period and at a second potential during a time period other than said second time period and having an amplitude equal to said power supply voltage, and, converting the amplitude of the reference clock signal to said predetermined voltage and supplying the result as an output, and a first capacitor having one electrode receiving an output clock signal of said amplitude converting circuit and another electrode connected to the input electrode of said transistor; wherein said predetermined voltage is twice as high as said power supply voltage, and said amplitude converting circuit includes:

a second capacitor, a charge circuit charging said second capacitor to said power supply voltage by supplying power supply potential to one electrode of said second capacitor and supplying a ground potential to another electrode of said second capacitor during a time period in which said reference clock signal is at said second or first potential, and a second switching circuit supplying said power supply potential to another electrode of said second capacitor charged by said charge circuit and connecting one electrode of said second capacitor to one electrode of said first capacitor during a time period in which said reference clock signal is at said first or second potential, and, supplying said ground potential to one electrode of said first capacitor during a time period in which said reference clock signal is at said second or first potential.

9. A charge pump circuit transferring positive charge or negative charge of an input node to an output node in synchronization with a clock signal, comprising:

a transistor connected between said input node and said output node;

a diode element connected between said input node and an input electrode of said transistor for preventing a flow of positive charge or negative charge of the input electrode of said transistor to said input node;

a first driving circuit pulling down or pulling up a potential of said input node by an amount of a power supply voltage during a first time period of each period of said clock signal; and a second driving circuit turning said first transistor conductive by pulling up or pulling down a potential of the input electrode of said first transistor by an amount of a predetermined voltage higher than said power supply voltage during a second time period in said first time period and transferring positive charge or negative charge of said input node to the output node; and said second driving circuit including:

an amplitude converting circuit receiving a reference clock signal having the same period with said clock signal, being at a first potential during said second time period of each period and at a second potential during a time period other than said second time period and having an amplitude equal to said power supply voltage, and, converting the amplitude of the reference clock signal to said predetermined voltage and supplying the result as an output, and a first capacitor having one electrode receiving an output clock signal of said amplitude converting circuit and another electrode connected to the input electrode of said transistor; wherein said amplitude converting circuit includes:

an internal charge pump circuit supplying positive charge to an internal power supply node, a control circuit controlling said charge pump circuit so as to turn a potential of said internal power supply node to a predetermined reference potential, and a second switching circuit connecting one electrode of said first capacitor to said internal power supply node during a time period in which said reference clock signal is at said first or second potential and supplying said ground potential to one electrode of said first capacitor during a time period in which said reference clock signal is at said second or first potential.

* * * * *